US011461032B1

(12) United States Patent
Tatsumi et al.

(10) Patent No.: US 11,461,032 B1
(45) Date of Patent: Oct. 4, 2022

(54) STORAGE CONTROLLER REPLACEMENT AND FIRMWARE UPGRADE WITHOUT SERVICE INTERRUPTION

(71) Applicant: Hitachi, Ltd., Tokyo (JP)

(72) Inventors: Ryosuke Tatsumi, Tokyo (JP); Akira Yamamoto, Tokyo (JP); Kazuki Matsugami, Tokyo (JP); Kenta Shinozuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/472,837

(22) Filed: Sep. 13, 2021

(30) Foreign Application Priority Data

Apr. 9, 2021 (JP) .............................. JP2021-066298

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0635* (2013.01); *G06F 3/0659* (2013.01)

(58) Field of Classification Search
None
See application file for complete search history.

(56) References Cited

U.S. PATENT DOCUMENTS

| 9,098,211 | B1 | 8/2015 | Madnani et al. | |
|---|---|---|---|---|
| 9,959,043 | B2 | 5/2018 | Cao et al. | |
| 10,185,639 | B1* | 1/2019 | Chatterjee | G06F 11/2092 |
| 2010/0199272 | A1* | 8/2010 | Mahajan | G06F 8/656 |
| | | | | 717/171 |
| 2011/0078334 | A1* | 3/2011 | Arakawa | H04L 67/1097 |
| | | | | 710/3 |
| 2012/0084508 | A1* | 4/2012 | Suzuki | G06F 11/2089 |
| | | | | 711/E12.001 |
| 2017/0242771 | A1* | 8/2017 | Khemani | G06F 11/2094 |

OTHER PUBLICATIONS

Commscope, Multiple AP Firmware Support—Commscope Technical Content Portal, Ruckus Smartzone Upgrade Guide, https://docs.commscope.com/bundle/sz-50-upgradeguide-sz/page/GUID-D3BB7A23-F7C1-4237-8A6A-E89014FE991D.html Jun. 2, 2019. (Year: 2019).*

* cited by examiner

*Primary Examiner* — Arpan P. Savla
*Assistant Examiner* — Edmund H Kwong
(74) *Attorney, Agent, or Firm* — Mattingly & Malur, PC

(57) ABSTRACT

A storage system includes: a storage drive having a storage medium storing a data; and a plurality of storage control units having a processor, a memory, and a port to process the data input and output to and from the storage drive, in which information related to a list of the storage control units mounted on the storage system and a maximum number of the storage control units that can be mounted on the storage system is allowed to be stored, and in which, when the storage control unit is replaced, it is determined whether the configuration to be migrated from the storage control unit to be reduced to the storage control unit to be added is migrated directly or via another storage control unit based on the number of the mounted storage control units and the maximum number of the storage control units that can be mounted.

13 Claims, 27 Drawing Sheets

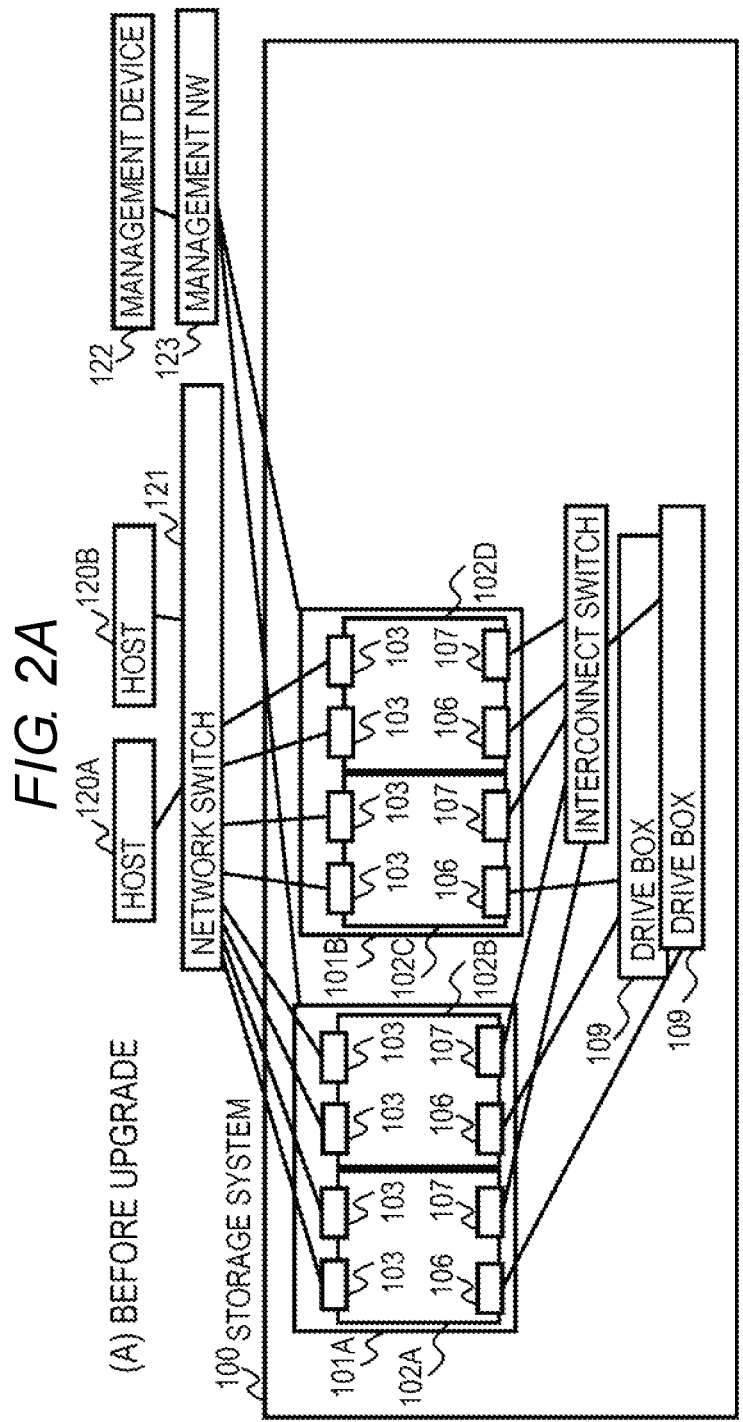

(B) IN-PROGRESS OF UPGRADE OF 101B

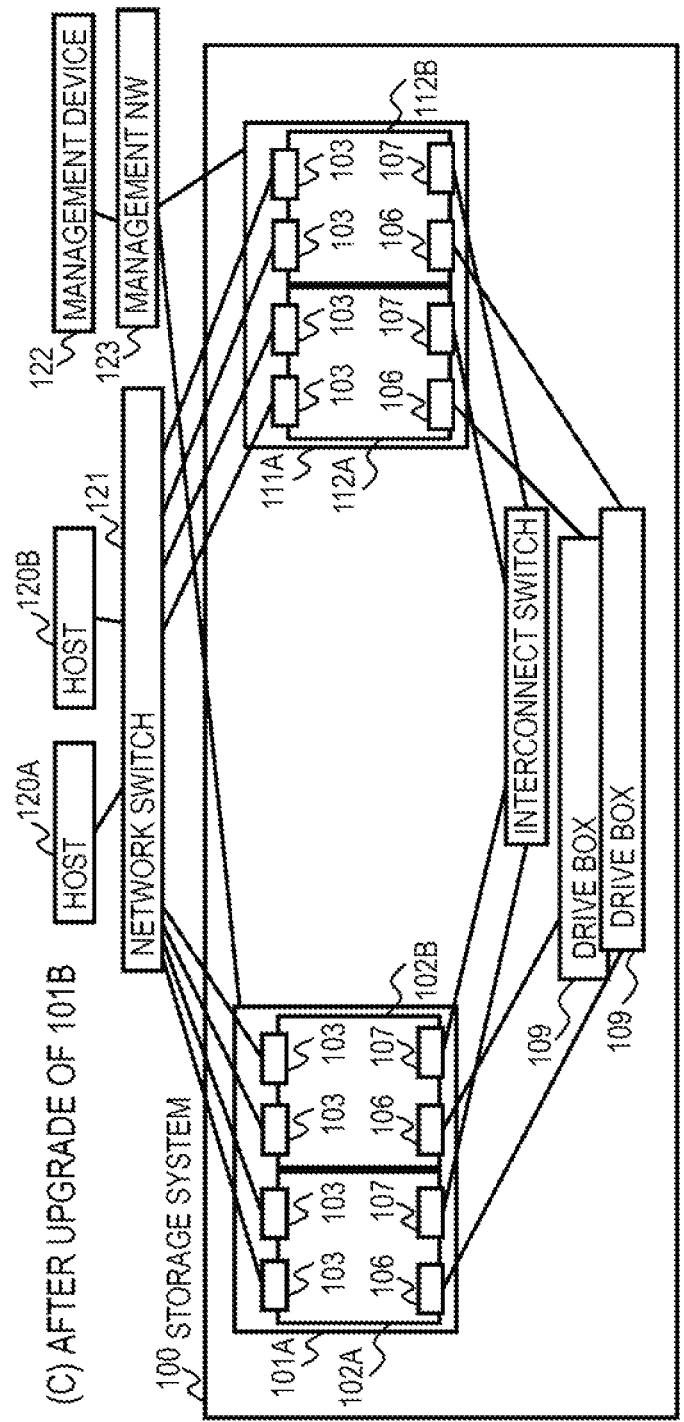

(D) IN-PROGRESS OF UPGRADE OF 101A

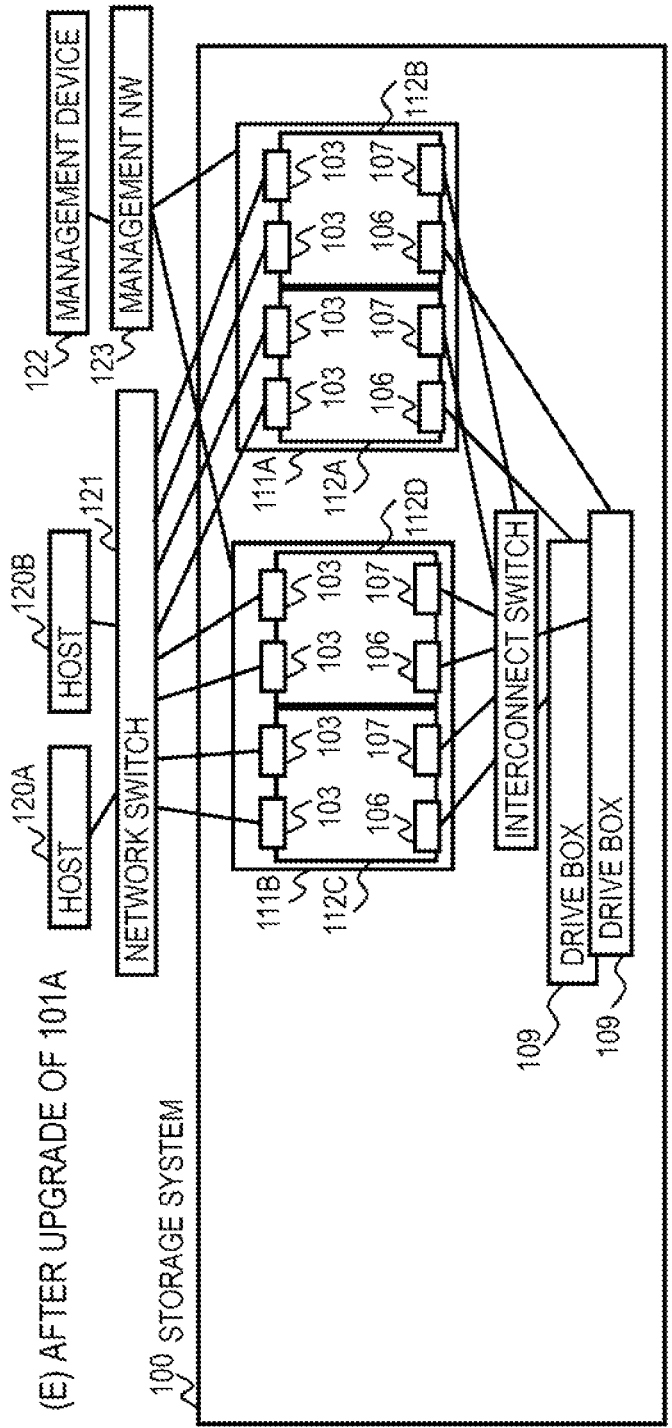

(B) IN-PROGRESS OF UPGRADE OF 101C (D) IN-PROGRESS OF UPGRADE OF 101B

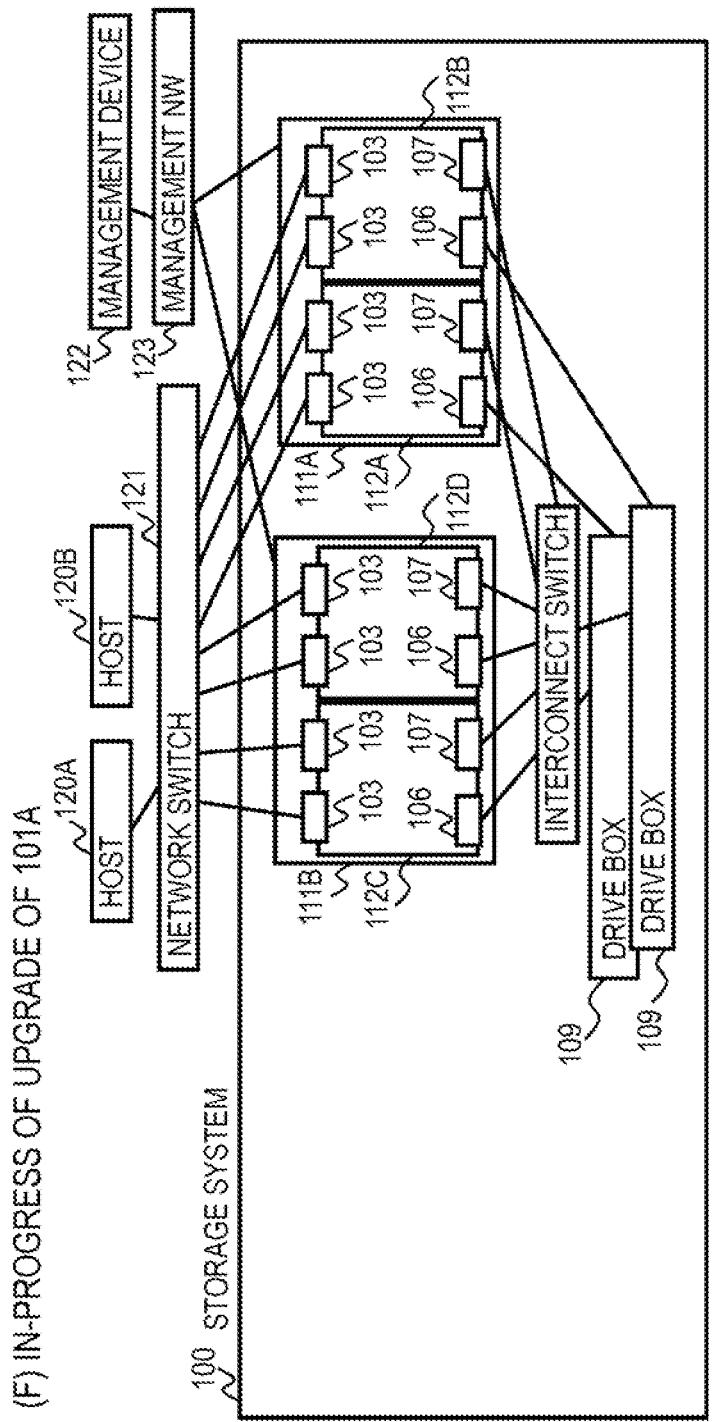

LUN CONFIGURATION INFORMATION

FE PORT CONFIGURATION INFORMATION

NEW CONTROLLER ADDITION

OLD CONTROLLER REDUCTION

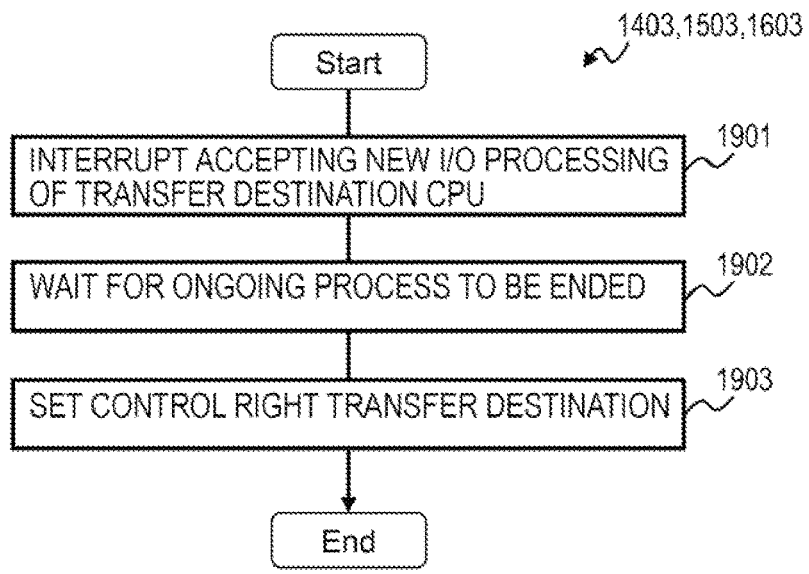
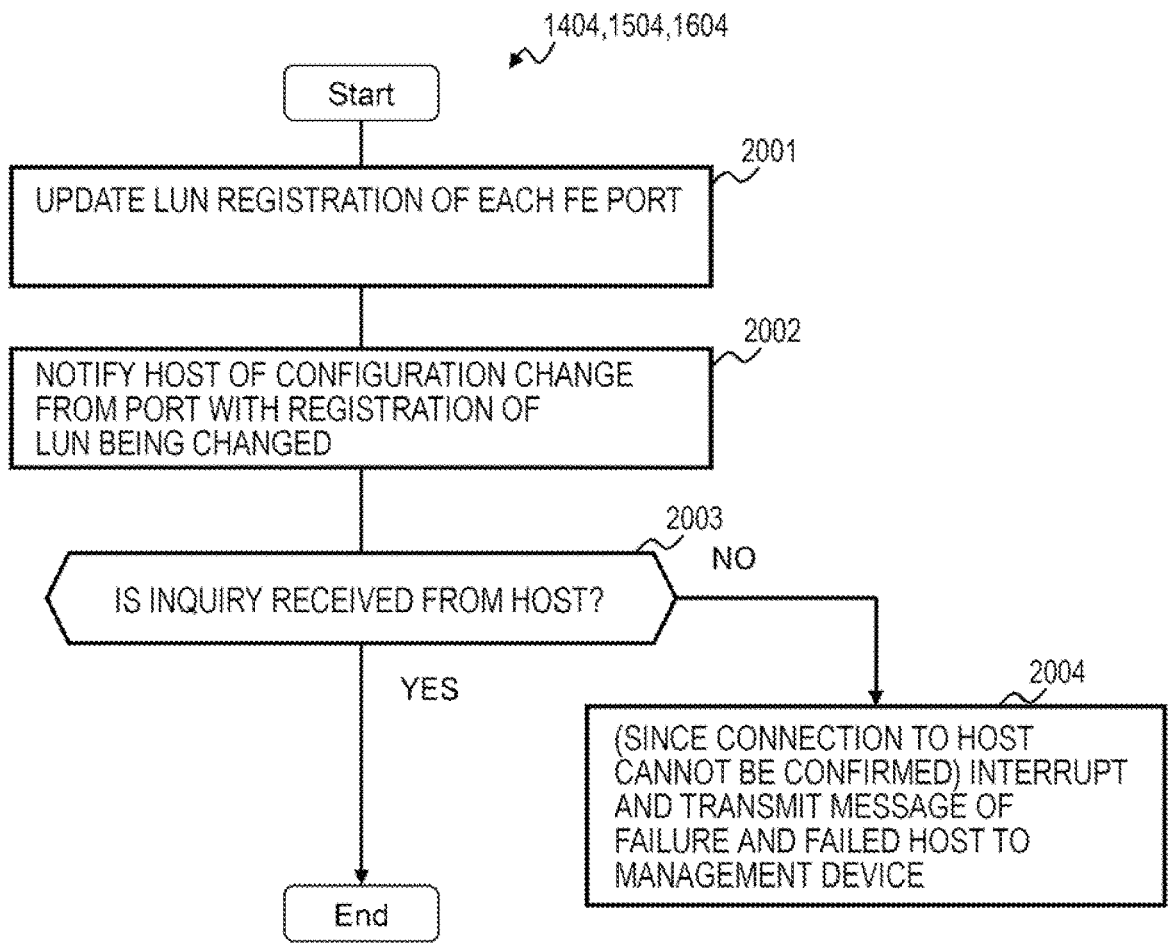

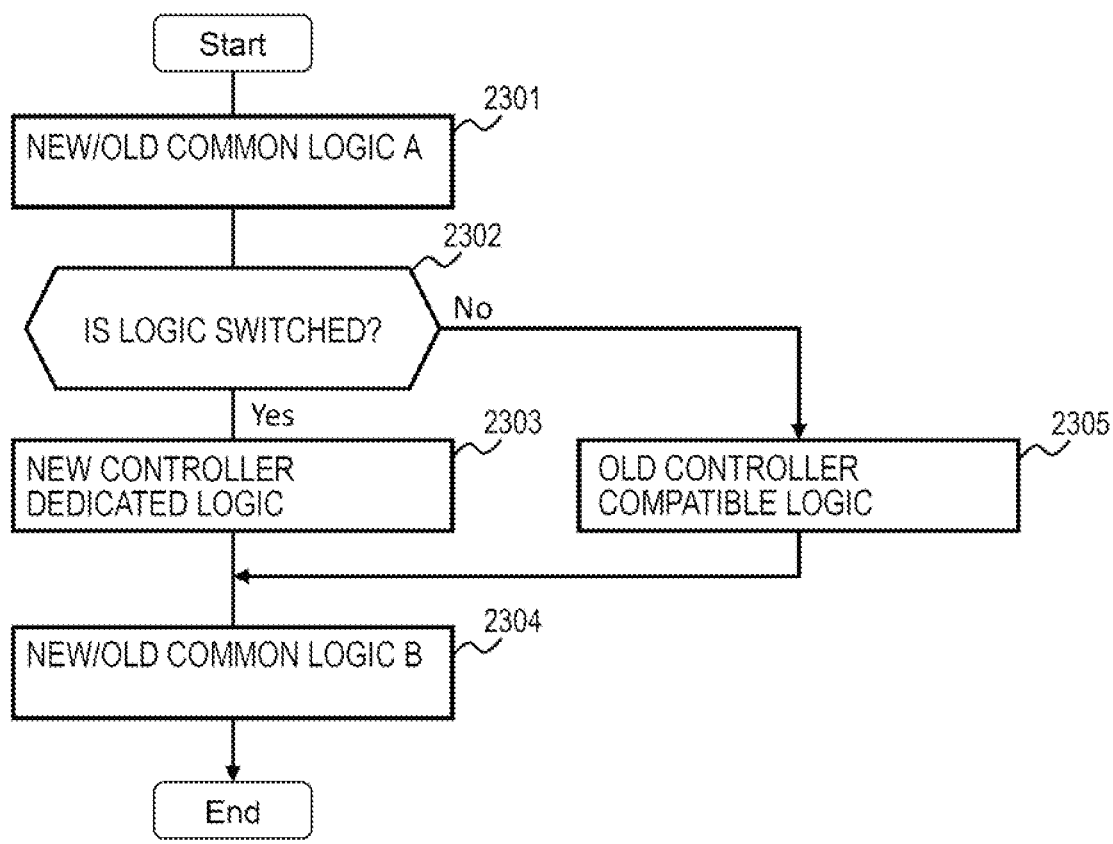

(A) NEW NODE ADDITION IN CASE OF BEING MAXIMUM CONFIGURATION (B) NEW NODE ADDITION IN CASE OF NOT BEING MAXIMUM CONFIGURATION (C) OLD NODE REDUCTION IN CASE OF NOT BEING MAXIMUM CONFIGURATION

STORAGE CONTROLLER REPLACEMENT AND FIRMWARE UPGRADE WITHOUT SERVICE INTERRUPTION

CLAIM OF PRIORITY

The present application claims priority from Japanese patent application JP 2021-066298 filed on Apr. 9, 2021 the content of which is hereby incorporated by reference into this application.

BACKGROUND OF THE INVENTION

1. Field of the Invention

The present invention relates to a storage controller replacement and upgrade of a storage system that uses a flash memory or a magnetic disk as a storage (storage medium) device.

2. Description of Related Art

In recent years, a large amount of data has been stored in a storage system due to an increase in capacity of a NAND flash memory. In addition, the storage system is required to be able to replace hardware and software with the latest ones without affecting the business of higher-level applications. Usually, the replacement of the storage system takes time for the setting and data migration process on a new storage system side.

U.S. Pat. No. 9,959,043 illustrates an invention for updating software of a storage system without interruption. After the software update, both the new and old data formats exist, and the new data contains references to the data in the old data format. By writing in the new data format when the data is updated, it is possible to update to the new data format without interruption of reading and writing the data.

U.S. Pat. No. 9,098,211 discloses an invention for performing non-interruption data migration between a plurality of storage systems. In order for the host to recognize that the storage system is a single storage system, a virtual storage system, a virtual port, and a virtual logical unit (LUN) that span a plurality of storages are configured. By associating the port name and port address of the physical port of the migration source with the virtual port name and port address of the system of the migration destination, the migration to the new storage system can be completed without interruption.

In a dual controller storage system, there is a method for updating the hardware of the storage system without interruption. According to this method, it is possible to update to a new controller without migrating the data of the connected drive. In addition, the configuration information of the storage system and the like are maintained. Replacement with new hardware is implemented by replacing the storage controllers one by one in order. This is a common method for replacing a controller in a storage system.

SUMMARY OF THE INVENTION

In U.S. Pat. No. 9,959,043, when a data format is updated for each data in a logical volume, by having a reference from the new data format to the old data, new software corresponds to a new data format while maintaining the old data format. However, in upgrading a storage controller in a storage system, there exists a control logic that application needs to be started after the upgrade of the storage controller is ended due to differences in hardware components of a hardware storage controller and specifications of the storage system. For example, this is a case where a new storage controller may be provided with a powerful CPU or hardware offload engine and, thus, data encryption or data compression algorithms of which computational cost is more expensive can be employed. U.S. Pat. No. 9,959,043 does not disclose a method for determining the start of application of such a control logic.

The present invention solves the following problems when updating the hardware and software of the storage system without interruption.

The first problem is that it is necessary to operate the control logic that can be operated only by the new storage controller in a state where the old storage controller does not exist in the storage system. Specifically, no matter how many storage controllers exist in the storage system, it is necessary to switch the control logic after all the storage controllers are upgraded to the new storage controllers.

The second problem is to prevent a decrease in the performance and redundancy of the storage system caused by a decrease in the number of storage controllers and the number of physical ports due to the update. However, due to hardware or software constraints, there is an upper limit to the number of storage controllers that can be connected in the storage system, so that the maximum number of storage controllers that can be connected needs to be considered when upgrading the storage controller.

In order to solve at least one of the above-described problems, a typical example of the invention disclosed in the present application is as follows. That is, according to one embodiment, there is provided a storage system including: a storage drive having a storage medium storing a data; and a plurality of storage control units having a processor, a memory, and a port to process the data input and output to and from the storage drive, in which information related to a list of the storage control units mounted on the storage system and a maximum number of the storage control units that can be mounted on the storage system is allowed to be stored, and in which, when the storage control unit is replaced, it is determined whether the configuration to be migrated from the storage control unit to be reduced to the storage control unit to be added is migrated directly or via another storage control unit based on the number of the mounted storage control units and the maximum number of the storage control units that can be mounted.

According to one aspect of the present invention, in a multi-controller storage system, depending on the number of connected storage controllers, it is possible to update to new hardware and new software without interruption and by suppressing the influence of redundancy and performance deterioration.

In addition, when sharing a drive box, the drive connected to the old storage controller can be taken over by the new storage controller, as it is.

Problems, configurations, and effects other than those described above will be clarified by the description of the following embodiments.

BRIEF DESCRIPTION OF THE DRAWINGS

FIG. 2A is an explanatory diagram illustrating an outline of a procedure for upgrading a storage controller when the number of storage controllers in the embodiment of the present invention is less than the maximum number of storage systems;

FIG. 2C is an explanatory diagram illustrating an outline of a procedure for upgrading the storage controller when the number of storage controllers in the embodiment of the present invention is less than the maximum number of storage systems;

FIG. 2E is an explanatory diagram illustrating an outline of a procedure for upgrading the storage controller when the number of storage controllers in the embodiment of the present invention is less than the maximum number of storage systems;

FIG. 3F is an explanatory diagram illustrating an outline of a procedure for upgrading the storage controller when the number of storage controllers in the embodiment of the present invention is equal to the maximum number of storage systems;

FIG. 19 is a flowchart illustrating a CPU processing control right switching process executed by the storage controller according to the embodiment of the present invention;

FIG. 20 is a flowchart illustrating an FE port switching process executed by the storage controller according to the embodiment of the present invention;

FIG. 23 is a flowchart illustrating a control logic including a control logic switching determination process executed by the storage controller in the embodiment of the present invention;

DESCRIPTION OF EMBODIMENTS

Figure 1:
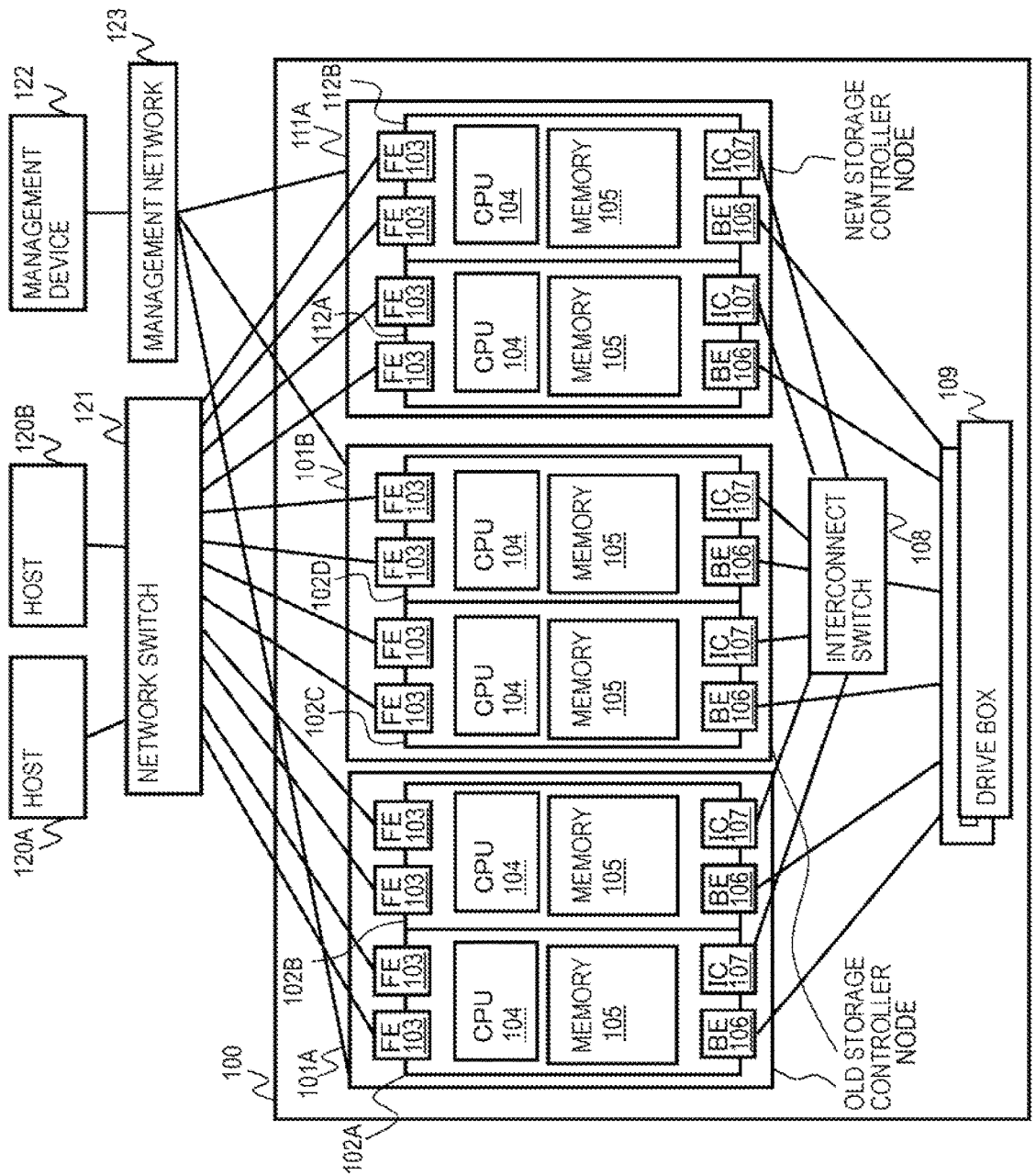
FIG. 1 is a block diagram illustrating a configuration of a storage system according to an embodiment of the present invention.

Hereinafter, examples of the present invention will be described with reference to the drawings. In the accompanying drawings, in some cases, functionally the same elements may be denoted by the same reference numeral. The accompanying drawings illustrate specific embodiments and examples according to the principles of the present invention. These embodiments and examples are for the understanding of the present invention and should not be used for a limitative interpretation of the present invention.

Furthermore, as described later, the embodiment of the present invention may be implemented by software operating on a general-purpose computer, may be implemented by dedicated hardware, or may be implemented by a combination of software and hardware.

Hereinafter, in some cases, each process in the embodiment of the present invention may be described with a "program" as a subject (subject of an operation). Since the program performs a process defined by being executed by a processor while using a memory and a communication port (communication control device), it is stated that the process may be described with the processor as a subject. A portion or all of the programs may be implemented by dedicated hardware or may be modularized. Various programs may be installed on each computer by a program distribution server or storage media.

In the following description, the "interface unit" may include at least one of a user interface unit and a communication interface unit. The user interface unit may include at least one I/O device of one or more I/O devices (for example, an input device (for example, a keyboard and a pointing device) and an output device (for example, a display device)) and a display computer. The communication interface unit may include one or more communication interface devices. One or more communication interface devices may be one or more communication interface devices of the same type (for example, one or more network interface cards (NIC)) or may be two or more communication interface devices of different types (for example, NIC and host bus adapter (HBA)).

In addition, in the following description, the "memory unit" includes one or more memories. At least one memory may be a volatile memory or a non-volatile memory. The memory unit is mainly used during processing by the processor unit.

In addition, in the following description, the "processor unit" includes one or more processors. At least one processor is typically a central processing unit (CPU).

In addition, in the following description, a "hardware accelerator unit" includes one or more hardware integrated circuits. At least one hardware integrated circuit is typically a field programmable gate array (FPGA).

In addition, in the description hereinafter, the information may be described by an expression such as "xxx table", but the information may be expressed by any data structure. That is, the "xxx table" can be referred to as "xxx information" in order to illustrate that the information does not depend on the data structure. In addition, in the description hereinafter, a configuration of each table is an example, and one table may be divided into two or more tables, or all or a portion of the two or more tables may be one table.

In addition, in the description hereinafter, in a case where elements of the same type are described without distinguishing, a common code among reference codes is used, and in a case where the elements of the same type are distinguished, reference codes (or element IDs (for example, identification numbers)) may be used. For example, in a case where a plurality of storage controllers are not distinguished, the plurality of storage controllers are described as a "storage controller 102", and in a case where the storage controllers are distinguished, the storage controllers are described as a "storage controller 102A" and a "storage controller 102B". The same applies to other elements (for example, a storage node 101, a front-end network port 103, a CPU 104, a memory 105, a back-end network port 106, an interconnect network port 107, a drive box 109, a host computer 110, and the like which will be described later).

In addition, in the following description, the "storage system" includes one or more storage devices. At least one storage device may be a general-purpose physical calculator. In addition, at least one storage device may be a virtual storage device, or software-defined anything (SDx) may be executed. As an SDx, for example, a software defined storage (SDS) (an example of a virtual storage device) or a software-defined datacenter (SDDC) may be employed.

Herein, an outline of the embodiment of the present invention for solving the above-mentioned two problems will be described.

The storage system which is an object of the present invention is a tightly coupled multi-controller system that has a plurality of storage controllers for redundancy which are connected to each other by a broadband, low-latency network such as PCIe or InfiniBand and share control information with each other. The control information is stored in two or more controllers for redundancy.

A method of solving the first problem will be described. Since the storage controller upgrade is performed without interruption, all the storage controllers are not replaced with the new storage controller all at once, but the old storage controllers and the new storage controllers coexist temporarily. Meanwhile, the software on each storage controller operates with a control logic that can be operated by any storage controller. After that, sequentially, the upgrade of the storage controller is ended, and after all the storage controllers are replaced with new storage controllers, an operation of the control logic that can be operated only by the new storage controllers is started.

A method of solving the second problem will be described. An old storage system has an interconnect connecting the storage controllers to each other and an interconnect network port that can be connected to any one of old and new storage controllers. During the updating, when the current configuration is less than a maximum number of connectable controllers, an operation of "adding a new storage controller and, after that, reducing the old storage controller" is repeated. On the other hand, when the current configuration is the maximum number of controllers that can be connected, the operation of "reducing the old storage controller and, after that, adding a new storage controller" is repeated.

The old storage controller and the new storage controller are connected by using a network port. At this time, the network port may be directly connected to the storage controller or may exist on a fabric network switch. In addition, similarly, a storage drive box that accommodates the storage device also has a back-end network port that can be connected to the new storage controller. In case of connection to the storage controller, by connecting between the drive box and the new storage controller, the storage device connected to the old storage controller can be accessed from the new storage controller without passing through the old storage controller.

When the old storage controller is reduced after addition of a new storage controller, for example, one multi-controller storage system is formed by adding a new storage controller to the old storage controller. After that, when the migration of the process and the control information is ended, the old storage controller is interrupted, and the old storage controller is reduced. These processes are repeated as long as the old storage controller exists.

On the other hand, when a new storage controller is added after reduction of the old storage controller, first, the storage controller that is an upgrade target is selected among the old storage controllers in the storage system, the processes and the control information shared with other controllers are saved in another storage controller that remains. After that, the old storage controller is interrupted and reduced. By doing so, a state where another storage controller can be added to the storage system is formed. After that, a new storage controller is added, and the processes and the control information saved in another storage controller are migrated to the added storage controller. These processes are repeated as long as the old storage controller remains.

Accordingly, in a case where the configuration of the storage system does not reach the upper limit of the number of connectable storage controllers, the update of the storage hardware and software is ended without reducing the number of storage controllers and the number of physical ports. In addition, even in a case where the configuration of the storage system reaches the upper limit of the number of connected controllers, the upgrade of the storage hardware and software is ended by suppressing a decrease in the number of storage controllers and the number of physical ports.

In a multi-controller storage system configuration after addition of the new storage system, the new storage software operating in the new storage controller and the old software operating in the old storage controller allow common control information to be accessed transparently via a network between the storage controllers. In addition, in the process of communicating between the controllers, the software on the new storage controller operates so as to be compatible with the software on the old storage controller. By doing so, each process executed in the storage system can be executed on any one of the old controller side and the new controller side, and thus, switching can be performed so that each process is executed on the new storage controller without interruption of the I/O. In addition, it is possible to flexibly and quickly correspond to a case of performing maintenance during upgrade, a case of interrupting and restoring to an original state, and the like. At the same time, the configuration information of the LUN or the like set before the update, the status of the replication, or the like, and access frequency information used for tearing of the storage media can be taken over in the process executed by the new controller, as it is.

Hereinafter, embodiments of the present invention for solving the above-described problems will be described with reference to the drawings.

FIG. 1 is a block diagram illustrating a configuration of a storage system according to an embodiment of the present invention.

A storage system 100 according to the embodiment includes a plurality of storage controllers 102 and 112, one or more interconnect switches 108, and one or more drive boxes 109. FIG. 1 illustrates storage controllers 102A to 102D and 112A and 112B as examples of the plurality of storage controllers 102 and 112. Among these storage controllers, the storage controllers 102A to 102D are old storage controllers that are to be reduced from now on, the storage controllers 102A and 102B constitute one storage node 101A, and the storage controllers 102C and 102D constitute one storage node 101B. On the other hand, the storage controllers 112A and 112B are new storage controllers that have been added and constitute one storage node 111A.

Each of the old storage controllers 102 to be reduced includes a CPU 104, a memory 105, a front-end network port (hereinafter, also referred to as an FE port) 103, a back-end network port (hereinafter, also referred to as a BE port) 106, and an interconnect network port (hereinafter, also referred to as an IC port) 107. Similarly, each of the new storage controllers 112 to be added includes a CPU 104, a memory 105, an FE port 103, a BE port 106, and an IC port 107.

In the example of FIG. 1, one storage controller 102 includes one CPU 104, one memory 105, two FE ports 103, one BE port 106, and one IC port 107, but these numbers are examples and, are the actual numbers are arbitrary. Similarly, the actual number of components of the storage controller that is an addition target is arbitrary. In addition to these components, a hardware offload engine such as an FPGA may be provided.

The FE port 103 is connected to a network switch 121. The network switch 121 is connected to one or more host computers 120 (host computers 120A and 120B in the example of FIG. 1). The storage controller 102 receives commands such as writing and reading of user data from the host computers 120 via the FE port 103 and the network switch 121, and returns a response to the host computers 120. The same applies to the storage controller 112.

The BE port 106 is connected to the drive box 109. The storage controller 102 writes and reads a user data to and from the drive box 109 via the BE port 106. The same applies to the storage controller 112.

The drive box 109 includes a storage medium storing the data written by the host computer 120. The storage medium may be a large-capacity non-volatile storage medium such as a magnetic disk or a flash memory.

The IC port 107 is connected to the interconnect switch 108. The interconnect switch 108 is connected to the IC port 107 of each of the storage controllers 102 and 112. The storage controller 102 can communicate with another storage controller 102 in the storage system 100 via the IC port 107 and the interconnect switch 108 and can transmit and receive, for example, the control information and the like. The same applies to the communication between the storage controller 102 and the storage controller 112 and the communication between the storage controllers 112.

The CPU 104 implements various functions of the storage controllers 102 and 112 by executing a program stored in the memory 105. Details of the functions implemented by the CPU 104 will be described later.

The memory 105 includes an area storing the program executed by the CPU 104, an area storing the control information of the storage controllers 102 and 112, an area storing the data to be written or read by the host computer 120, and the like. Details of these areas will be described later.

Furthermore, each of the storage controllers 102 and 112 is connected to a management device 122 via a management network 123.

Next, a procedure for upgrading the storage controllers 102 will be described with reference to FIGS. 2A to 2E and FIGS. 3A to 3G.

FIGS. 2A to 2E are explanatory diagrams illustrating an outline of a procedure for upgrading the storage controllers when the number of storage controllers in the embodiment of the present invention is less than the maximum number of storage systems.

FIG. 2A illustrates the storage system 100 before the upgrade of the storage controller 102 is started. At this time, the storage system 100 has the old storage controllers 102A to 102D and does not have the new storage controllers 112A and 112B. At this time, the redundancy is ensured by the four storage controllers 102A to 102D.

Figure 2B:
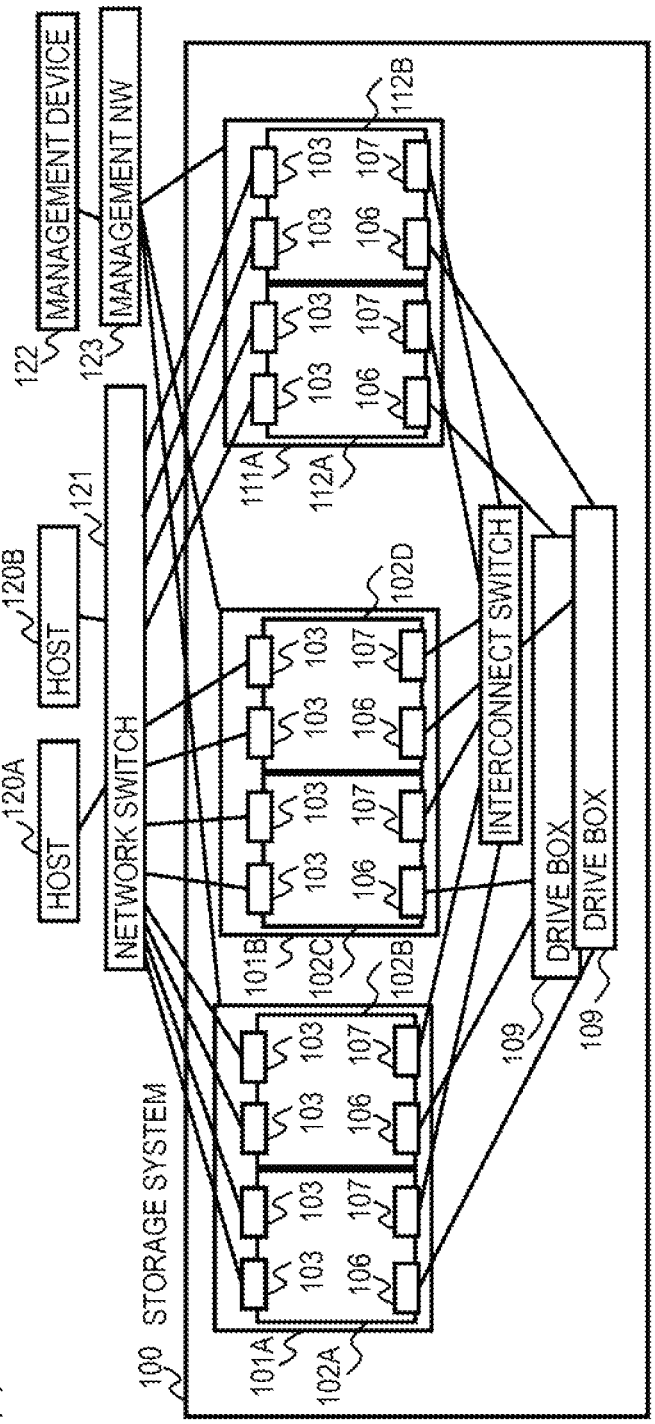
FIG. 2B is an explanatory diagram illustrating an outline of a procedure for upgrading the storage controller when the number of storage controllers in the embodiment of the present invention is less than the maximum number of storage systems.

FIG. 2B illustrates the storage system 100 after the new storage node 111A is added when the upgrade of the storage node 101B is in progress. At this time, the storage system 100 has the new storage controllers 112A and 112B added in addition to the old storage controllers 102A to 102D. At this time, the redundancy is ensured by the six storage controllers 102A to 102D and 112A to 112B.

FIG. 2C illustrates the storage system 100 after the upgrade of the storage node 101B is ended. At this time, the old storage controllers 102C and 102D have already been reduced, and the storage system 100 has the old storage controllers 102A and 102B and the new storage controllers 112A and 112B. At this time, the redundancy is ensured by the four storage controllers 102A, 102B, 112A, and 112B.

Figure 2D:
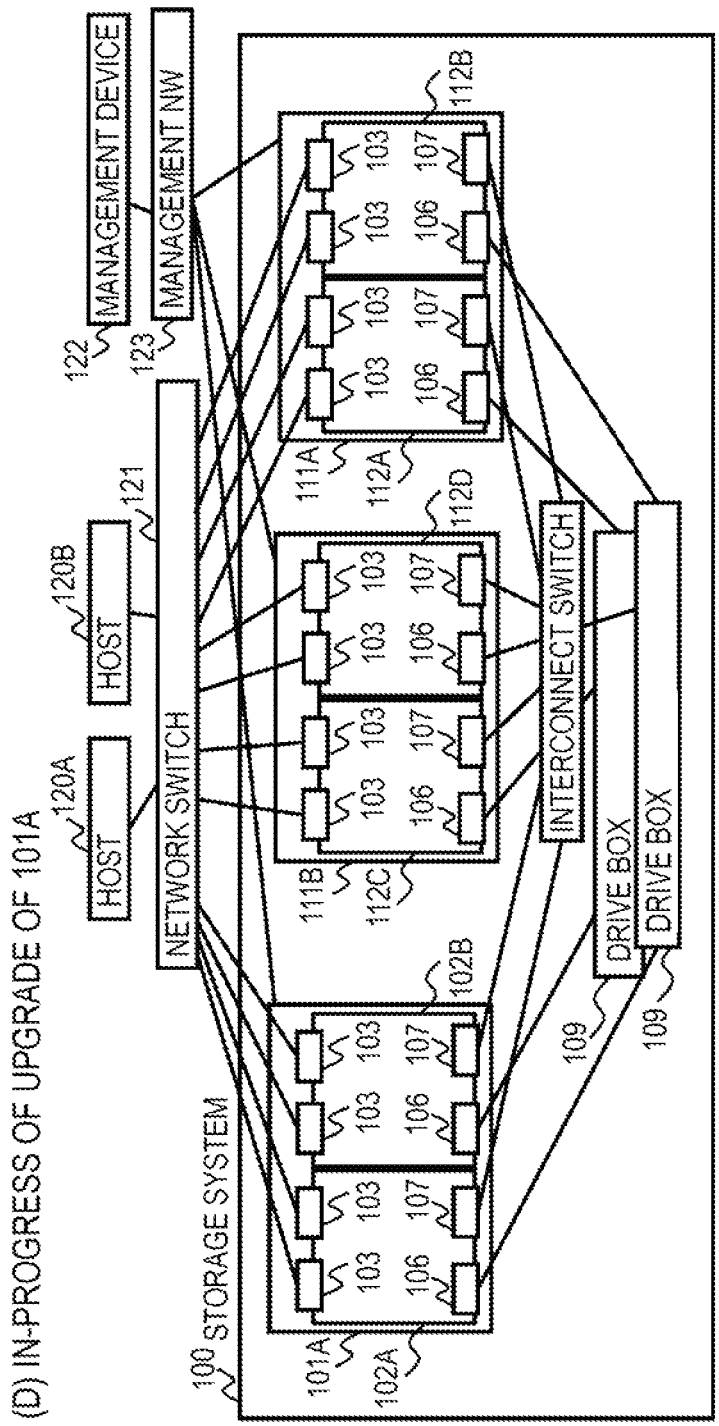
FIG. 2D is an explanatory diagram illustrating an outline of a procedure for upgrading the storage controller when the number of storage controllers in the embodiment of the present invention is less than the maximum number of storage systems.

FIG. 2D illustrates the storage system 100 after a new storage node 111B is added when the upgrade of the storage node 101A is in progress. At this time, the storage system 100 has new storage controllers 112A to 112D added in addition to the old storage controllers 102A to 102B. At this time, the redundancy is ensured by the six storage controllers 102A to 102B and 112A to 112D.

FIG. 2E illustrates the storage system 100 after the upgrade of the storage node 101A is ended. At this time, the old storage controllers 102A and 102B have already been reduced, and the storage system 100 has new storage controllers 112A to 112D. At this time, the redundancy is ensured by the four storage controllers 112A to 112D.

The above-described procedure ensures at least as much redundancy as before the start of the upgrade and after the end of the upgrade, even when the upgrade is in progress.

FIGS. 3A to 3G are explanatory diagrams illustrating an outline of a procedure for upgrading the storage controllers when the number of storage controllers in the embodiment of the present invention is equal to the maximum number of storage systems.

Figure 3A:
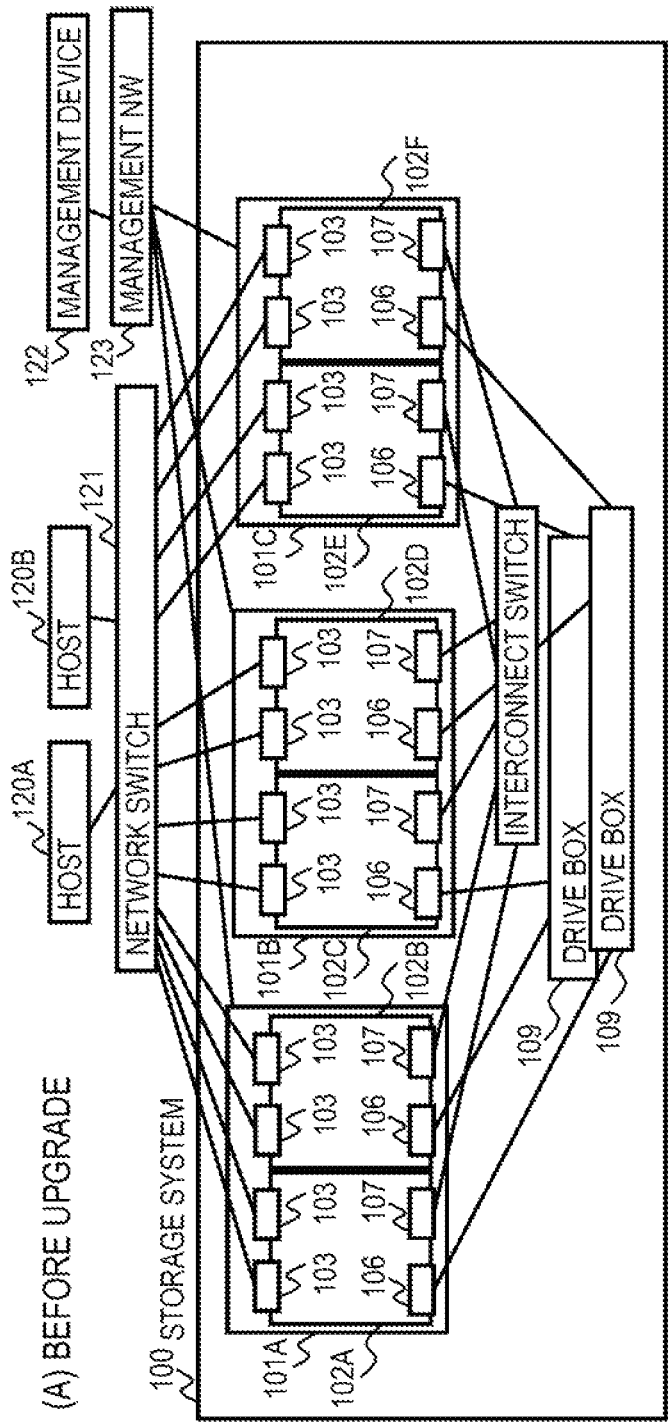
FIG. 3A is an explanatory diagram illustrating an outline of a procedure for upgrading the storage controller when the number of storage controllers in the embodiment of the present invention is equal to the maximum number of storage systems.

FIG. 3A illustrates the storage system 100 before the upgrade of the storage controller 102 is started. At this time, the storage system 100 has old storage controllers 102A to 102F and does not have the new storage controller 112. At this time, the redundancy is ensured by the six storage controllers 102A to 102F. In the example of this figure, the upper limit of the number of storage controllers in the storage system is set to 6, but the actual upper limit number differs depending on the storage system.

Figure 3B:
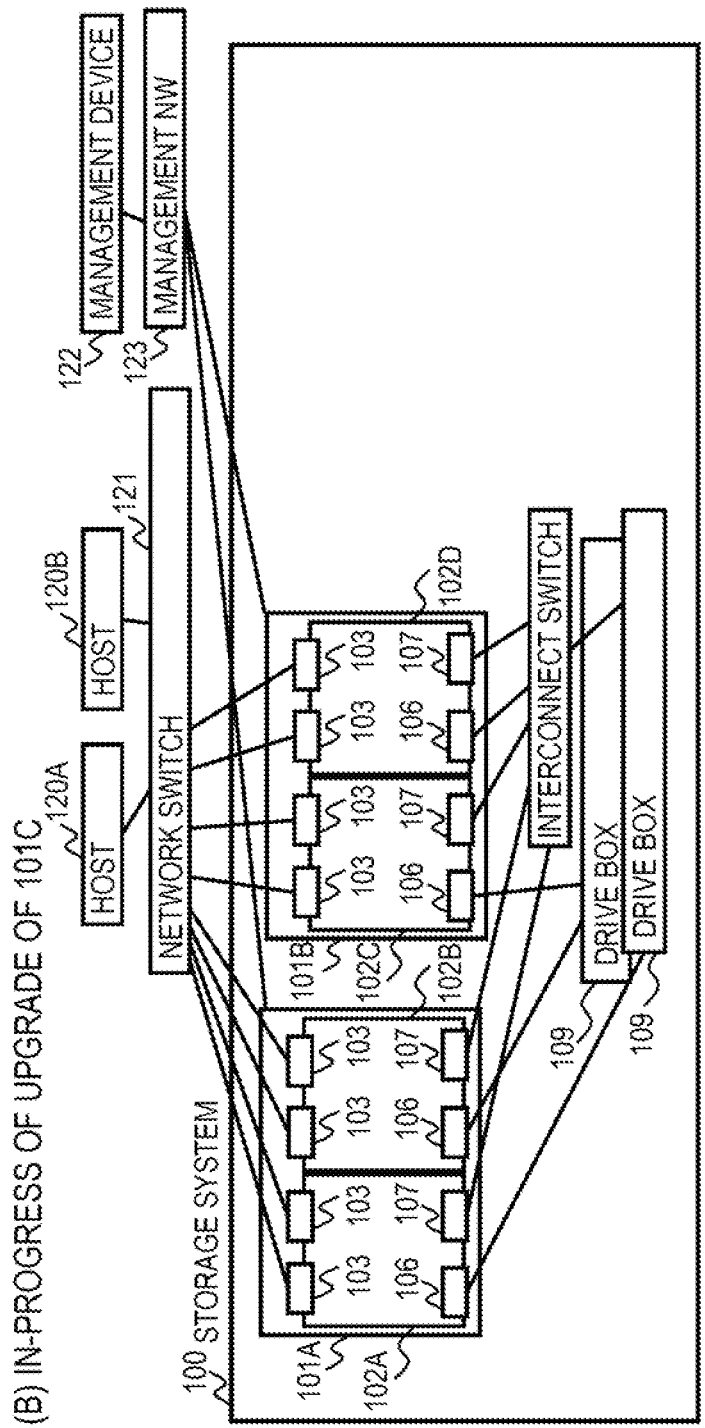
FIG. 3B is an explanatory diagram illustrating an outline of a procedure for upgrading the storage controller when the number of storage controllers in the embodiment of the present invention is equal to the maximum number of storage systems.

FIG. 3B illustrates the storage system 100 after an old storage node 101C is reduced when the upgrade of the storage node 101C is in progress. At this time, the storage system 100 has old storage controllers 102A to 102D. At this time, the redundancy is ensured by the four storage controllers 102A to 102D.

Figure 3C:
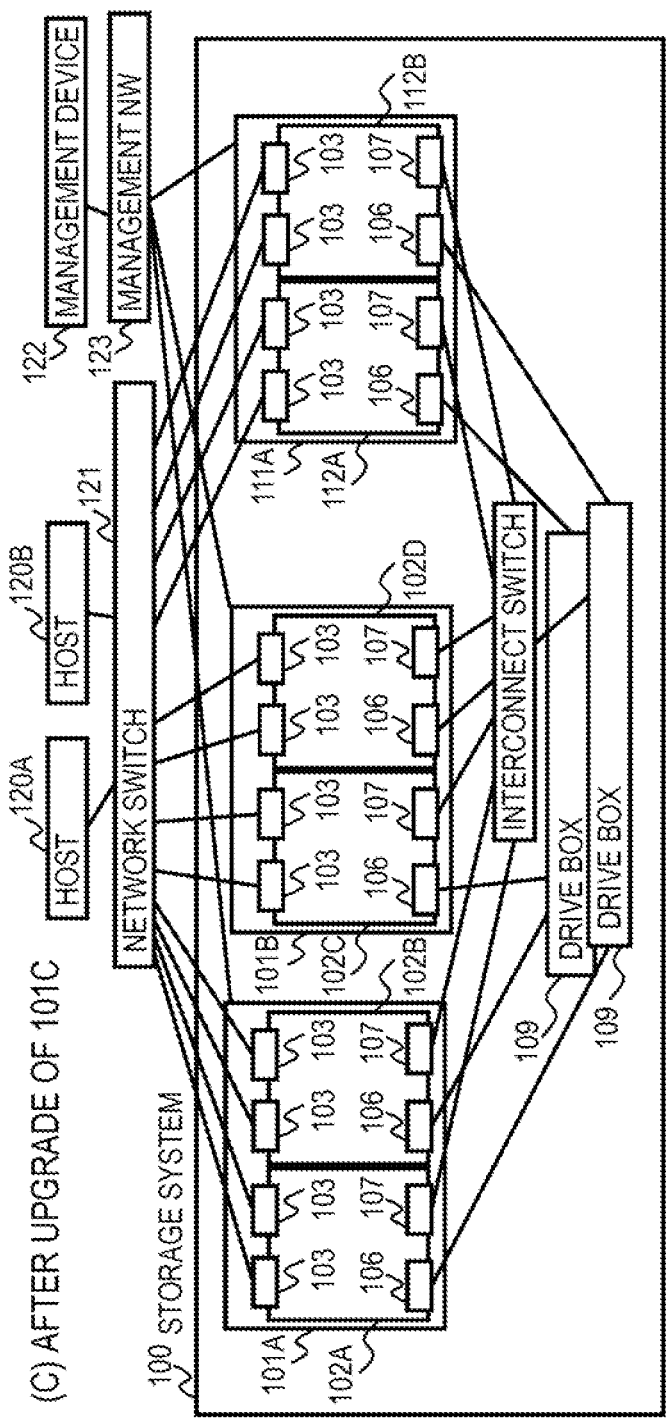
FIG. 3C is an explanatory diagram illustrating an outline of a procedure for upgrading the storage controller when the number of storage controllers in the embodiment of the present invention is equal to the maximum number of storage systems.

FIG. 3C illustrates the storage system 100 after the upgrade of the storage node 101C is ended, that is, after the new storage node 111A is added. At this time, the storage system 100 has the new storage controllers 112A and 112B added in addition to the old storage controllers 102A to 102D. At this time, the redundancy is ensured by the six storage controllers 102A to 102D and 112A to 112B.

Figure 3D:
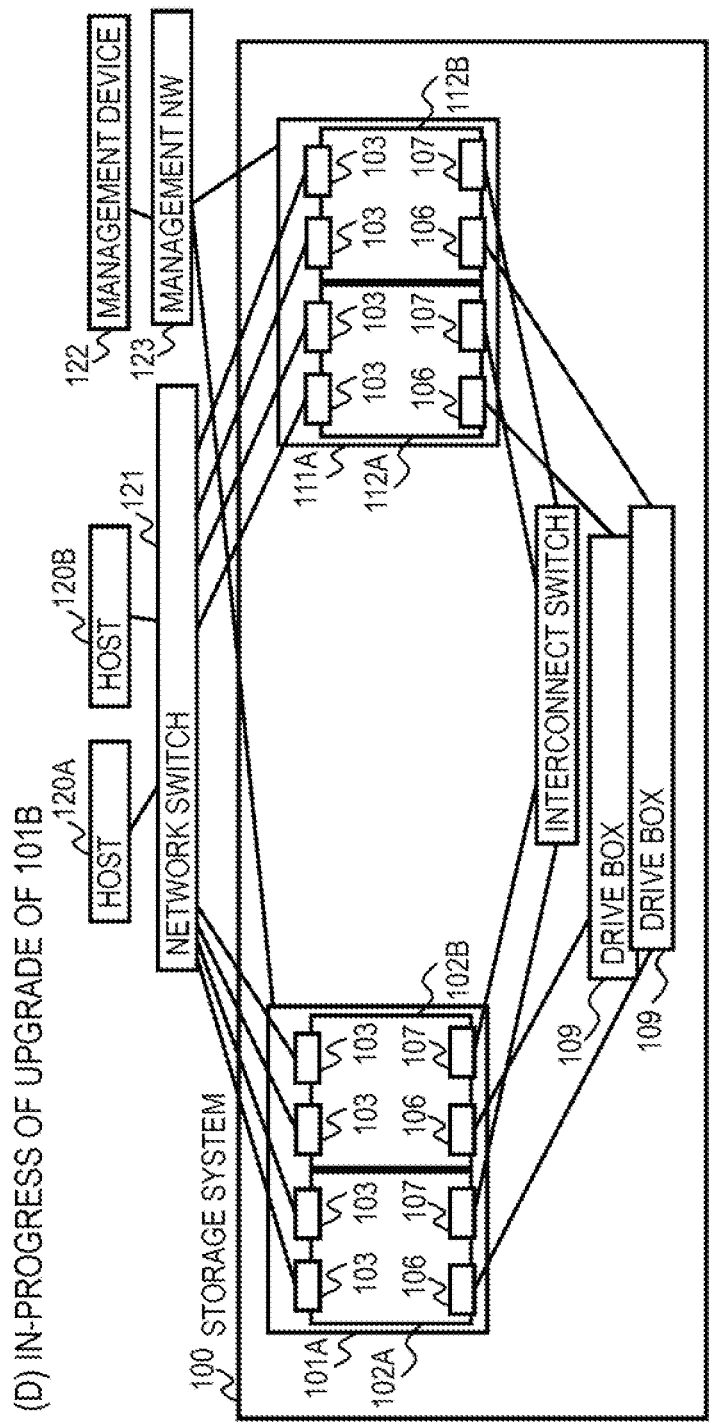
FIG. 3D is an explanatory diagram illustrating an outline of a procedure for upgrading the storage controller when the number of storage controllers in the embodiment of the present invention is equal to the maximum number of storage systems.

FIG. 3D illustrates the storage system 100 after the old storage node 101B is reduced when the upgrade of the storage node 101B is in progress. At this time, the storage system 100 has old storage controllers 102A and 102B and new storage controllers 112A and 112B. At this time, the redundancy is ensured by the four storage controllers 102A, 102B, 112A, and 112B.

Figure 3E:
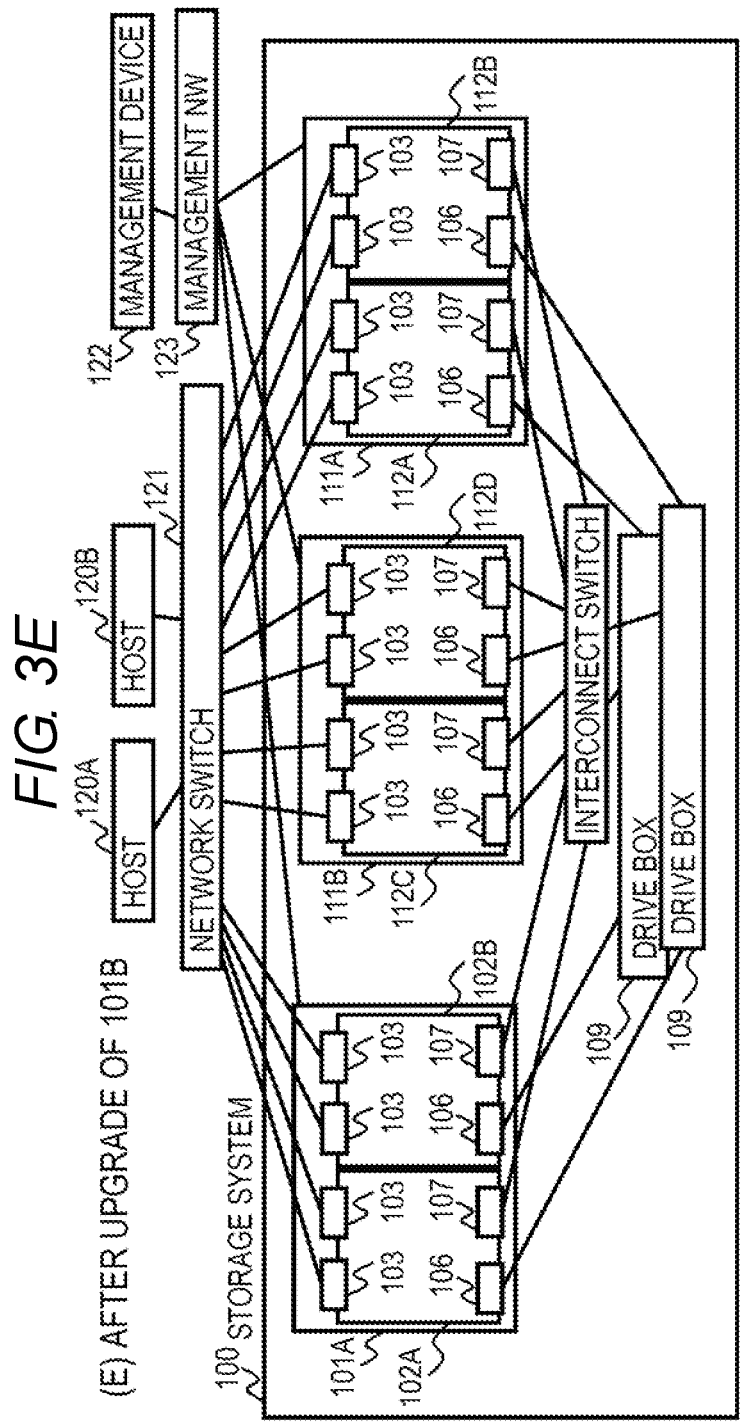
FIG. 3E is an explanatory diagram illustrating an outline of a procedure for upgrading the storage controller when the number of storage controllers in the embodiment of the present invention is equal to the maximum number of storage systems.

FIG. 3E illustrates the storage system 100 after the upgrade of the storage node 101B is ended, that is, after the new storage node 111B is added. At this time, the storage system 100 has the new storage controllers 112A to 112D added in addition to the old storage controllers 102A and 102B. At this time, the redundancy is ensured by the six storage controllers 102A, 102B, and 112A to 112D.

FIG. 3F illustrates the storage system 100 after the old storage node 101C is reduced when the upgrade of the storage node 101A is in progress. At this time, the storage system 100 has new storage controllers 112A to 112D. At this time, the redundancy is ensured by the four storage controllers 112A to 112D.

Figure 3G:
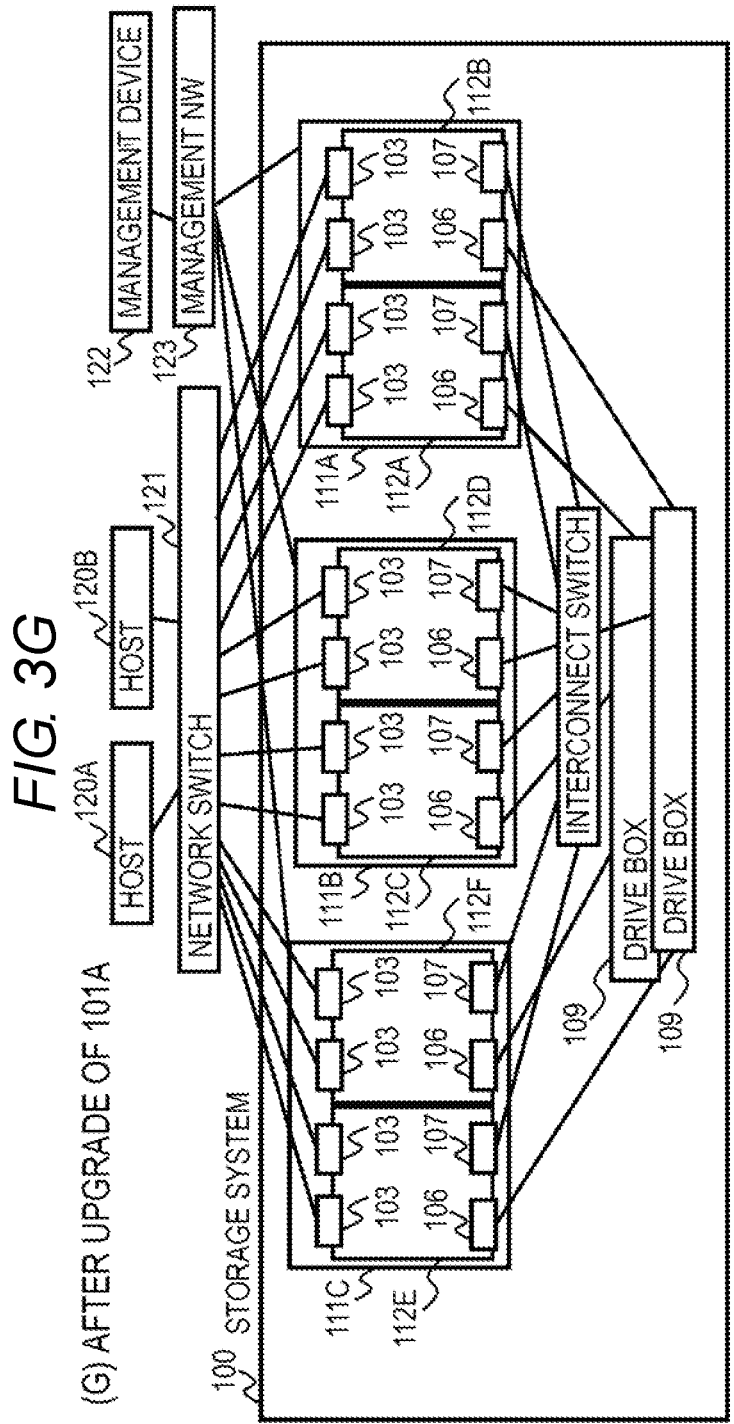
FIG. 3G is an explanatory diagram illustrating an outline of a procedure for upgrading the storage controller when the number of storage controllers in the embodiment of the present invention is equal to the maximum number of storage systems.

FIG. 3G illustrates the storage system 100 after the upgrade of the storage node 101A is ended, that is, after a new storage node 111C is added. At this time, the storage system 100 has new storage controllers 112A to 112F added in addition to the old storage controllers 102A and 102B. At this time, the redundancy is ensured by the six storage controllers 112A to 112F.

By the above-described procedure, in a case where the upgrade is executed when the number of storage controllers has reached the upper limit, when the upgrade is in-progress, in comparison to before the start of the upgrade, the redundancy deterioration of one node is suppressed, and after the upgrade is ended, the same redundancy as before the start is ensured.

In this procedure of the embodiment, the minimum unit for the addition and the reduction has been described as one storage node, but the addition and the reduction may be performed for each one controller in the storage node.

It is noted that the present invention can also be applied to the case where the storage controller is replaced for a purpose other than the upgrade of such a case where the new storage controller 112 is the same model as the old storage controller 102. However, in the embodiment, a replacement for upgrading the old storage controller 102 to a new storage controller 112 of a different type such as a successor model in which a new function is added to the old storage controller will be described.

Next, the information stored by the memory 105 of the storage controllers 102 and 112 will be described with reference to FIGS. 4 to 12. Herein, the information stored by the memory 105 of the storage controller 102 will be described as an example, but the memory 105 of the storage controller 112 also stores the same information.

Figure 4:
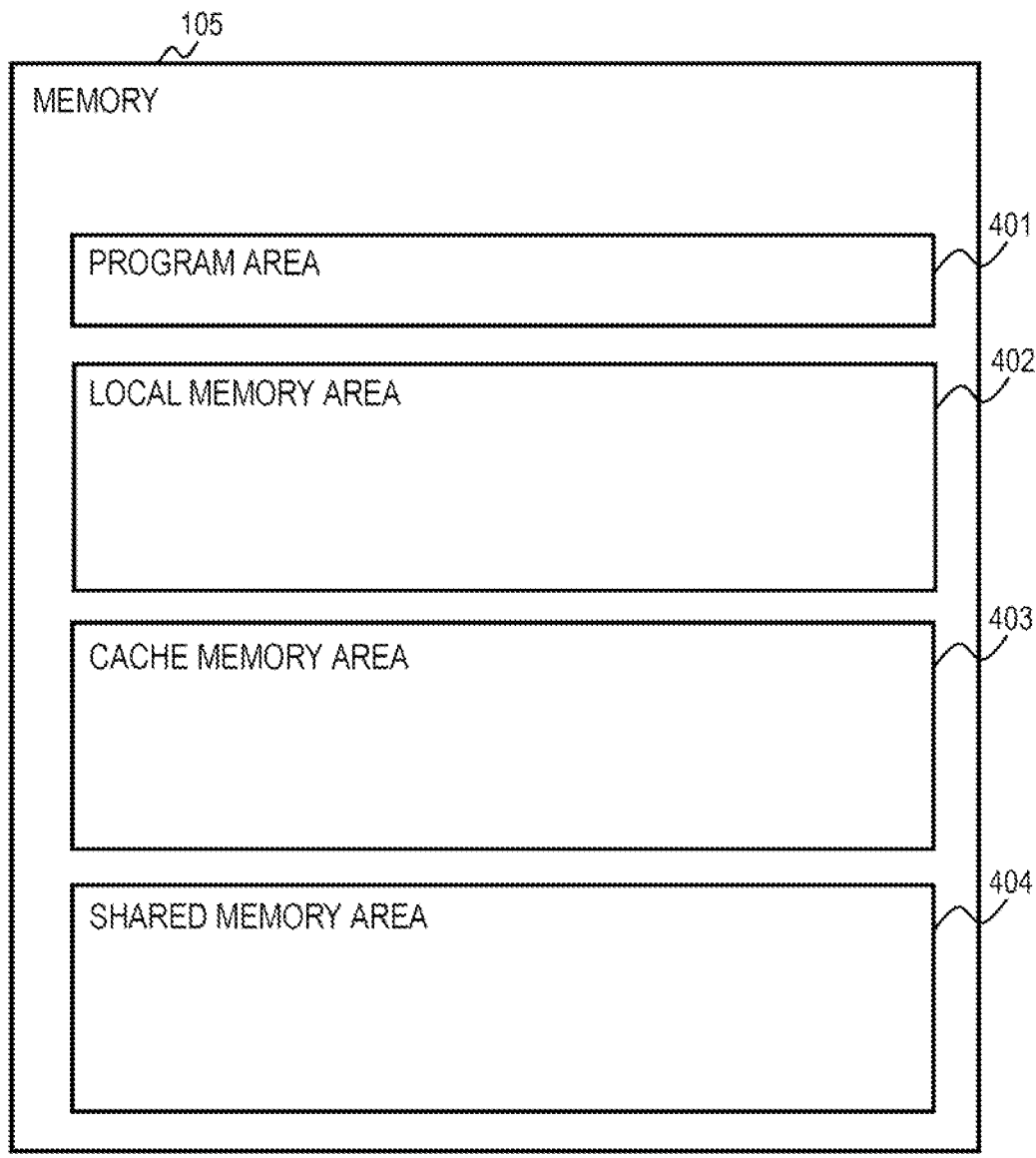
FIG. 4 is an explanatory diagram illustrating a configuration of a memory included in the storage controller according to the embodiment of the present invention.

FIG. 4 is an explanatory diagram illustrating a configuration of the memory 105 included in the storage controller 102 according to the embodiment of the present invention.

The memory 105 includes a program area 401, a local memory area 402, a cache memory area 403, and a shared memory area 404 as storage areas. The program area 401 stores a control program executed by the CPU 104 in the storage controller 102. The local memory area 402 includes a memory area temporarily used when the control program is executed and an area storing a copy of the control information included in the shared memory area 404. The cache memory area 403 is an area temporarily storing the data written from the host computer 120 and the data read by the host computer 120. The shared memory area 404 contains the information about the storage system 100 used by the control program. The shared memory area 404 is unique information shared by all the storage controllers 102 and 112 and may be stored across the plurality of storage controllers 102 and 112. In addition, the shared memory area 404 may be allowed to be redundant among the plurality of storage controllers in order to withstand failures with respect to the storage controllers 102 and 112 and the memory 105.

Figure 5:
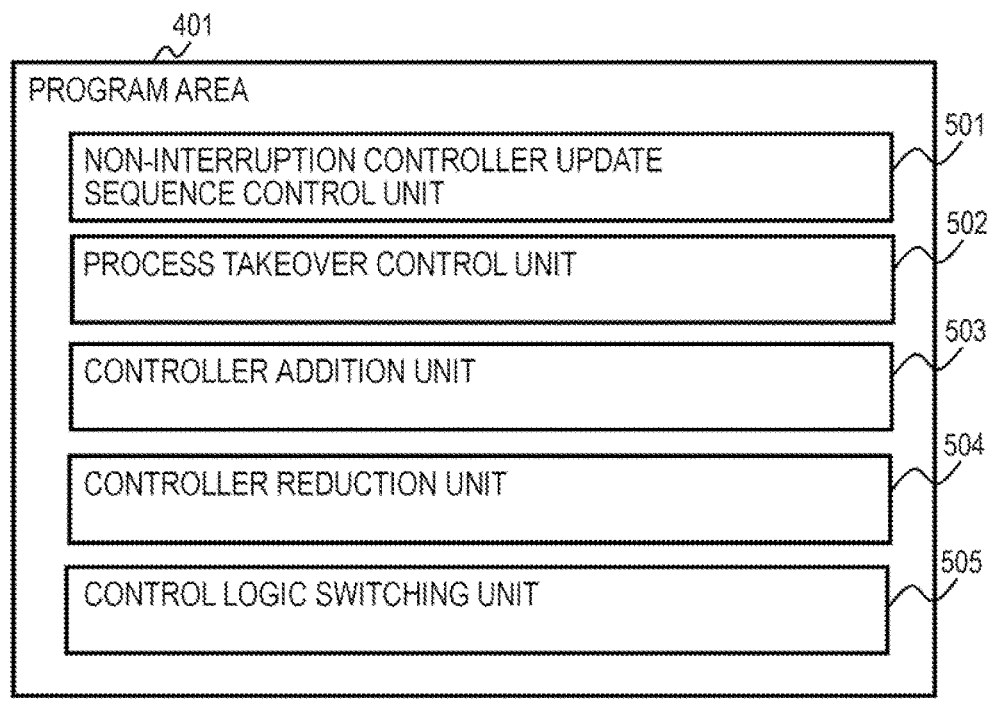
FIG. 5 is an explanatory diagram illustrating a configuration of a program area in the memory of the storage controller according to the embodiment of the present invention.

FIG. 5 is an explanatory diagram illustrating the configuration of the program area 401 in the memory 105 of the storage controller 102 according to the embodiment of the present invention.

A non-interruption controller update sequence control unit 501, a process takeover control unit 502, a controller addition unit 503, a controller reduction unit 504, and the I/O processing unit 607 are stored in the program area 401. All of these are programs stored in the memory 105 and executed by the CPU 104. In the following description, the processing executed by each of the above-described units is actually executed by the CPU 104 according to the program.

The non-interruption controller update sequence control unit 501 controls the replacement sequence of the storage controller 102 of the embodiment. The process takeover control unit 502 performs a process of taking over the process control right for each LUN, the LUN registration of the FE port, and the data stored in the shared memory from the storage controller 102 which is a replacement target to the storage controller 112 which is a replacement destination. The controller addition unit 503 performs processing at the time of addition of the new storage controller 112. The controller reduction unit 504 performs processing at the time of reduction of the old storage controller 102.

A control logic switching unit 505 performs a process of switching the control logic to a logic dedicated to the new storage controllers 112 after the upgrade of the old storage controller 102 is ended and all the storage controllers in the storage system become the new storage controllers 112.

Figure 6:
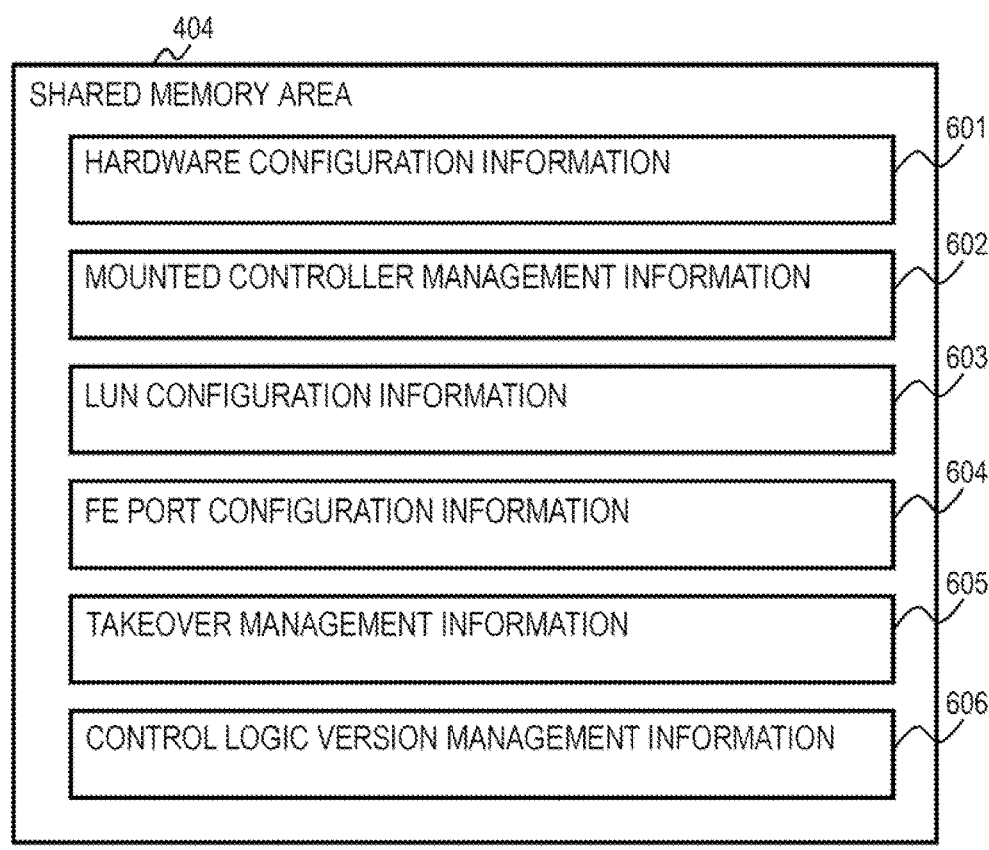
FIG. 6 is an explanatory diagram illustrating a configuration of a shared memory in the memory of the storage controller according to the embodiment of the present invention.

FIG. 6 is an explanatory diagram illustrating a configuration of the shared memory area 404 in the memory 105 of the storage controller 102 according to the embodiment of the present invention.

The shared memory area 404 stores hardware configuration information 601, mounted controller management information 602, LUN configuration information 603, FE port configuration information 604, takeover management information 605, and control logic version management information 606. Details of these will be described later (refer to FIGS. 7 to 12).

Figure 7:
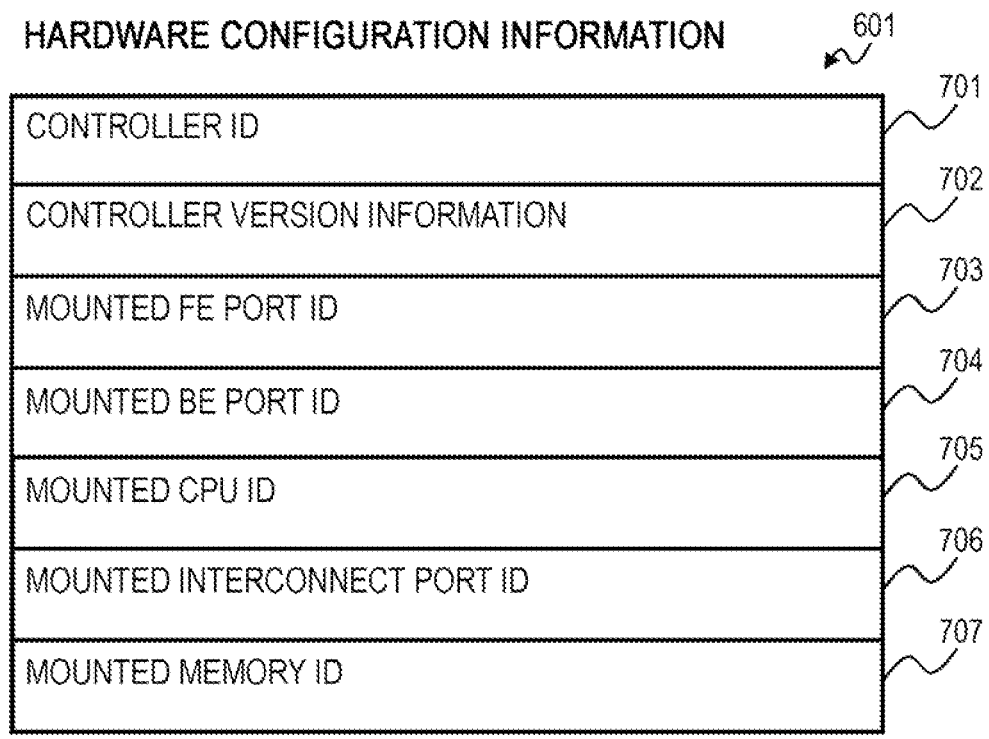
FIG. 7 is an explanatory diagram illustrating a configuration of hardware configuration information stored in the memory of the storage controller according to the embodiment of the present invention.

FIG. 7 is an explanatory diagram illustrating a configuration of the hardware configuration information 601 stored in the memory 105 of the storage controller 102 according to the embodiment of the present invention.

The hardware configuration information 601 includes a controller ID 701, controller version information 702, a mounted FE port ID 703, a mounted BE port ID 704, a mounted CPU ID 705, a mounted interconnect port ID 706, and a mounted memory ID 707.

The controller ID 701 is identification information of each storage controller 102. The controller version information 702 is version information of the hardware corresponding to the controller ID 701. Accordingly, it is possible to determine whether each storage controller is an old storage controller or a new storage controller. The mounted FE port ID 703, the mounted BE port ID 704, the mounted CPU ID 705, the mounted interconnect port ID 706, and the mounted memory ID 707 are identification information of the FE port 103, the BE port 106, the CPU 104, the IC port 107, and the memory 105 mounted on each storage controller 102, respectively.

Figure 8:
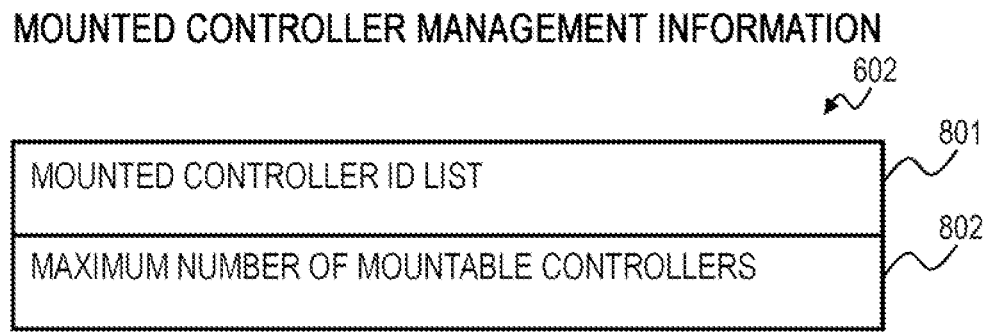
FIG. 8 is an explanatory diagram illustrating a configuration of mounted controller management information stored in the memory of the storage controller according to the embodiment of the present invention.

FIG. 8 is an explanatory diagram illustrating the configuration of the mounted controller management information 602 stored in the memory 105 of the storage controller 102 according to the embodiment of the present invention.

The mounted controller management information 602 includes amounted controller ID list 801 and a maximum number 802 of mountable controllers. The mounted controller ID list 801 is a list of identification information of the storage controller 102 that is mounted on the storage system 100 and is in a state where processing such as data input/output (I/O) can be executed. The maximum number of mountable controllers is an upper limit of the number of storage controllers that can be mounted by the storage system 100. In the example of FIGS. 2A to 3G, the maximum number 802 of mountable controllers is "6".

For example, as illustrated in FIG. 2A, the identification information of the old storage controllers 102A to 102D is stored in the mounted controller ID list 801 in the state before the new storage controllers 112A and 112B are added. As illustrated in FIG. 2B, when the new storage controllers 112A and 112B are mounted and the upgrade processing is in progress, the identification information of the storage controllers 102A to 102D, 112A, and 112B is stored in the mounted controller ID list 801. As illustrated in FIG. 2C, the identification information of the old storage controllers 102A and 102B and the new storage controllers 112A and 112B is stored in the mounted controller ID list 801 in the state after the old storage controllers 102C and 102D are reduced.

Figure 9:
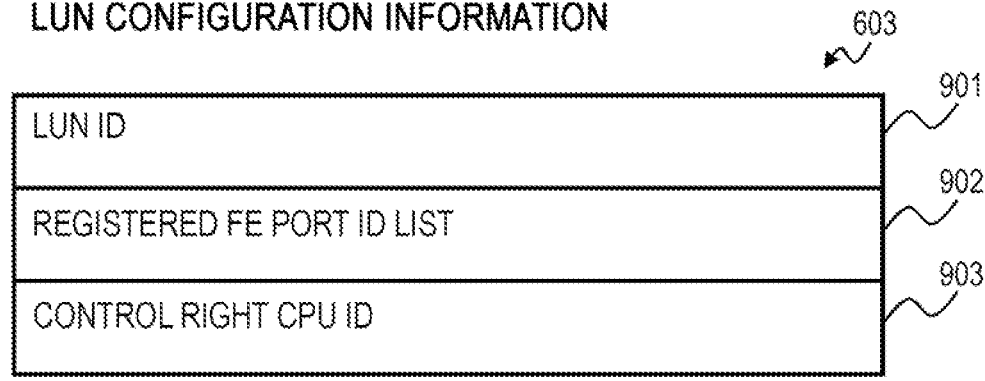
FIG. 9 is an explanatory diagram illustrating a configuration of LUN configuration information stored in the memory of the storage controller according to the embodiment of the present invention.

FIG. 9 is an explanatory diagram illustrating a configuration of the LUN configuration information 603 stored in the memory 105 of the storage controller 102 according to the embodiment of the present invention.

The LUN configuration information 603 is information indicating the configuration of each logical unit, and one LUN configuration information 603 is stored for one logical unit. The LUN configuration information 603 includes an LUN ID 901, a registered FE port ID list 902, and a control right CPU ID 903.

The LUN ID 901 is identification information of each logical unit. The FE port ID list 902 is a list of FE port identification information in which a path to each logical unit is set. The control right CPU ID 903 is identification information of the CPU 104 that exclusively accesses the control information related to the I/O processing to each logical unit.

Each logical unit is associated with an FE port belonging to a plurality of different storage controllers for the purpose of load distribution and failover in the event of a failure.

Figure 10:
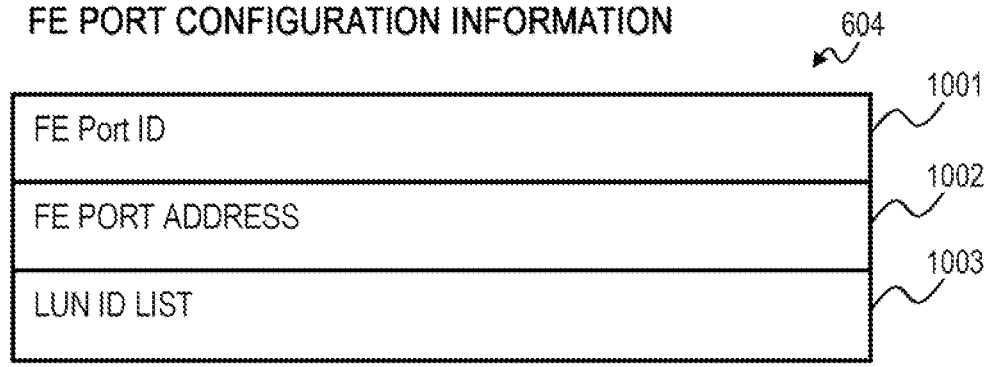
FIG. 10 is an explanatory diagram illustrating a configuration of FE port configuration information stored in the memory of the storage controller according to the embodiment of the present invention.

FIG. 10 is an explanatory diagram illustrating the configuration of the FE port configuration information 604 stored in the memory 105 of the storage controller 102 according to the embodiment of the present invention.

The FE port configuration information 604 is information indicating the configuration of each FE port 103. Each storage controller 102 stores the FE port configuration information 604 about all the FE ports of the storage controller 102. The FE port configuration information 604 includes an FE port ID 1001, an FE port address 1002, and a LUN ID list 1003.

The FE port ID 1001 is identification information of each FE port 103. The FE port address 1002 is identification information of each FE port 103 provided to the host computer 120. The LUN ID list 1004 is a list of information that identifies a logical unit in which a path to the host computer 120 is set via each FE port. Paths to a plurality of the logical units may be set in one FE port 103, and in this case, a plurality of values are stored as the LUN ID list 1004.

Figure 11:
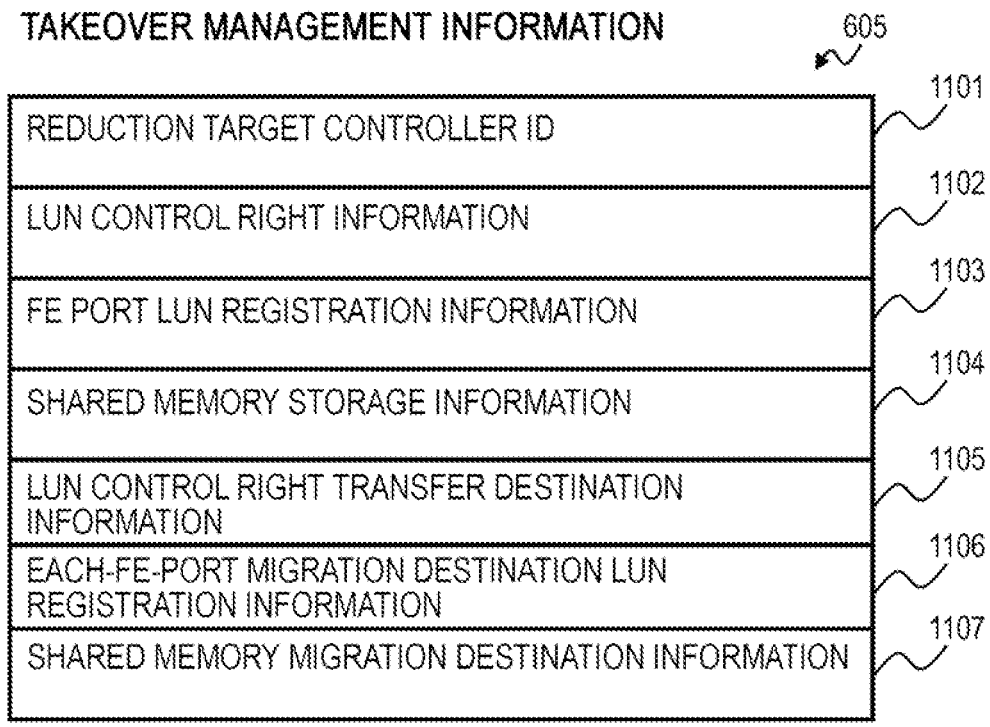
FIG. 11 is an explanatory diagram illustrating a configuration of takeover management information stored in the memory of the storage controller according to the embodiment of the present invention.

FIG. 11 is an explanatory diagram illustrating a configuration of the takeover management information 605 stored in the memory 105 of the storage controller 102 according to the embodiment of the present invention.

The takeover management information 605 is information indicating a target to be taken over from the old storage controller 102 which is a replacement target to the new storage controller which is a replacement destination. This information is temporarily generated during the storage controller upgrade process. The takeover management information 605 includes reduction target controller ID 1101, LUN control right information 1102, FE port LUN registration information 1103, shared memory storage information 1104, LUN control right transfer destination information 1105, each-FE-port migration destination LUN registration information 1106, and shared memory migration destination information 1107.

The reduction target controller ID 1101 is identification information indicating the old storage controller 102 when the replacement is in-progress. The LUN control right information 1102 is a list of the LUNs of which control right is retained by the old storage controller 102 which is a replacement target before the start of replacement. The FE port LUN registration information 1103 is a list of LUNs registered in each FE port 103 of the old storage controller 102 which is a replacement target before the start of replacement. The shared memory storage information 1104 is information indicating an area of the shared memory stored in the memory 105 of the old storage controller 102 which is a replacement target.

The LUN control right transfer destination information 1105 indicates a storage controller to which the LUN control right is temporarily transferred when the old storage controller 102 is reduced before addition of the new storage controller 112. Specifically, the LUN control right transfer destination information 1105 stores the storage controller information of the migration destination for each LUN. The each-FE-port migration destination LUN registration information 1106 indicates the LUN registration information of each FE port to which the LUN registration destination FE port is temporarily migrated when the old storage controller 102 is reduced before addition of the new storage controller 112. The FE port of the registration destination may be different for each LUN. The shared memory migration destination information 1107 indicates the migration destination storage controller 102 (or 112) to which the shared memory is temporarily migrated when the old storage controller 102 is reduced before addition of the new storage controller 112.

Figure 12:
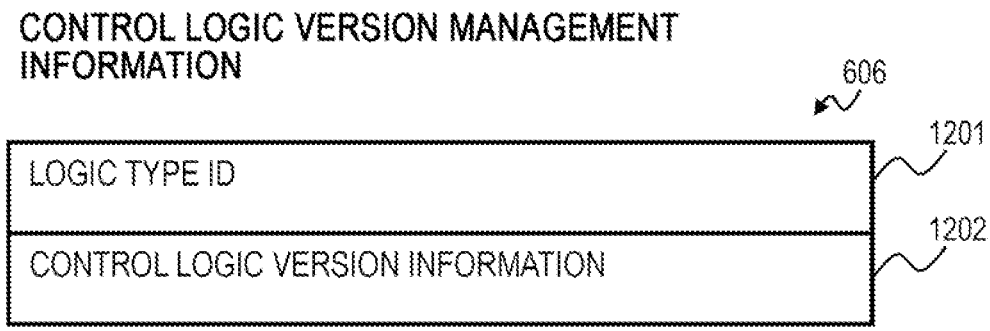
FIG. 12 is an explanatory diagram illustrating a configuration of control logic version management information stored in the memory of the storage controller according to the embodiment of the present invention.

FIG. 12 is an explanatory diagram illustrating a configuration of the control logic version management information 606 stored in the memory 105 of the storage controller 102 according to the embodiment of the present invention.

The control logic version management information 606 is control information that manages the switching of the control logic accompanying the storage controller upgrade in the embodiment of the present invention. The control logic version management information 606 includes logic type ID 1201 and control logic version information 1202. The logic type ID 1201 is identification information indicating a control logic which is a switching target. The control logic version information 1202 is information used for determining the control logic switching.

Next, the processing executed by the storage controllers 102 and 112 will be described with reference to the flowchart. The following processing is implemented by the CPU 104 of the storage controllers 102 and 112 executing the program stored in the program area 401 in the memory 105.

It is noted that the following description of FIGS. 13 to 16 illustrates an example of the process executed by any of the old storage controllers 102, but when one or more new storage controllers 112 have already been added, the new storage controller 112 may perform the following processing. In particular, the process in which the old storage controller 102 remaining in the storage system 100 until the end is targeted for reduction is executed by the new storage controller 112.

Figure 13:
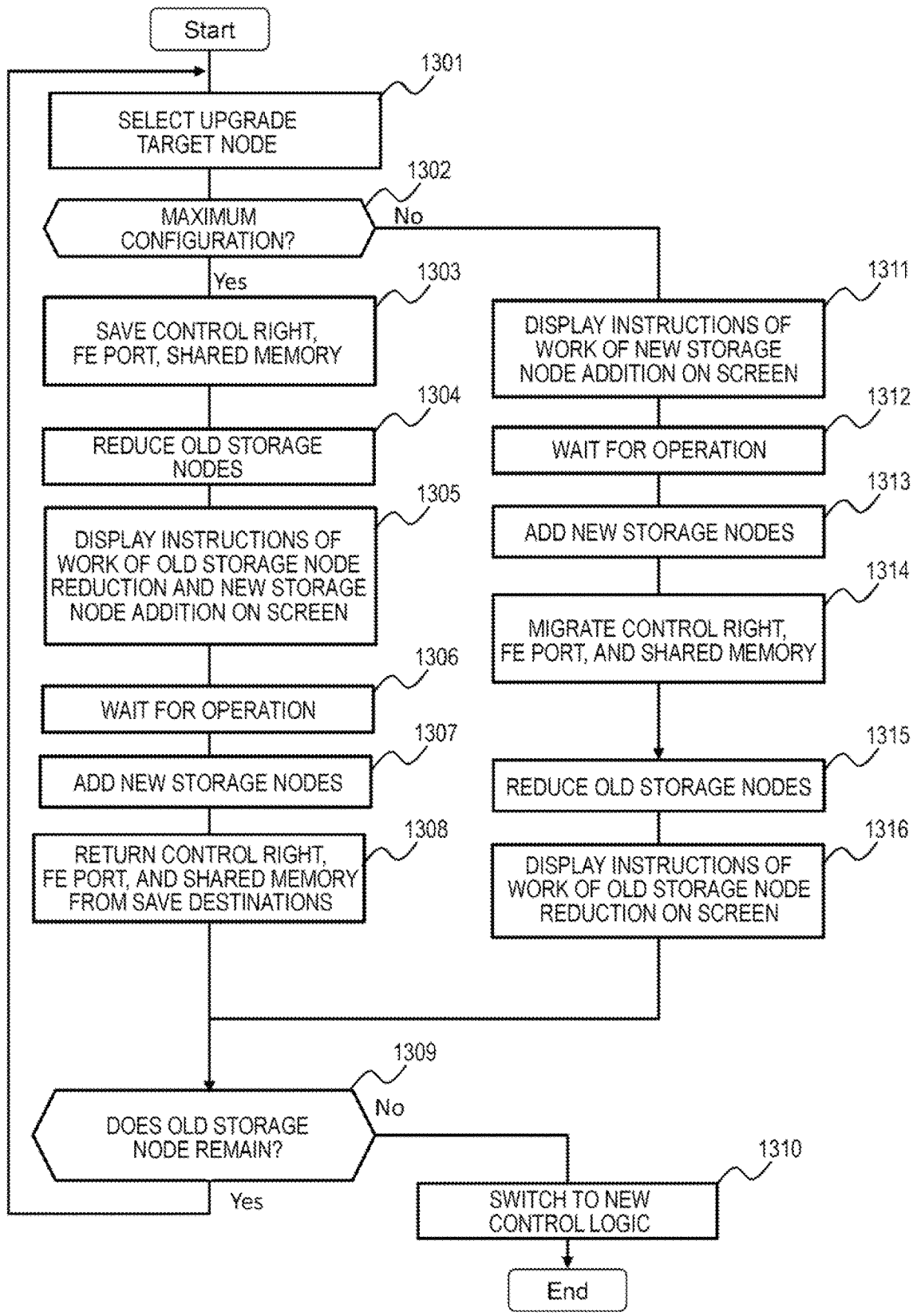
FIG. 13 is a flowchart illustrating the entire controller update process executed by the storage controller according to the embodiment of the present invention.

FIG. 13 is a flowchart illustrating the entire controller update process executed by the storage controller in the embodiment of the present invention. In the embodiment, the processing procedure for updating in units of storage nodes is illustrated. Even in the case of updating in units of storage controllers, the same procedure can be performed.

First, the storage controller 102 specifies a node that is an upgrade target (step 1301). Next, by referring to the mounted controller management information 602, the storage controller 102 determines whether or not the current configuration is the maximum configuration (step 1302). When the current configuration is already the maximum configuration, it is determined that the storage controllers will be upgraded by the procedure of reduction and, after that, addition, and the process proceeds to step 1303. In addition, when the number of storage controllers is less than the maximum number, it is determined that the storage controllers will be upgraded in the procedure of addition and, after that, reduction, and the process proceeds to step 1311.

In step 1303, the control right of the LUN, the FE port allocation of the LUN, and the stored shared memory information from the storage controller that is a reduction target are saved across another storage controller 102 or 112 or both which are not the reduction targets. The saved information is stored in the takeover management information 405.

Next, the storage controller 102 reduces the old storage nodes 101 which are reduction targets (step 1304).

Next, in order to urge the workers to install the apparatus and wire the cables and the like, the storage controller 102 displays instructions for the reduction work of the old storage node 101 and the addition work of the new storage node 111 on the management screen (step 1305) and waits for the operation from the worker (step 1306). The management screen is, for example, a screen displayed by a display device (not illustrated) of the management device 122. An example of the screen displayed in step 1305 will be described later with reference to FIG. 24A. In addition, the details of the operation of the worker executed in step 1306 will be described later with reference to FIGS. 21 and 22.

When receiving the operation from the worker, the storage controller 102 starts a process of adding the new storage nodes 111 (step 1307).

Next, by using the information stored in the takeover management information 405, the storage controller 102 migrates the LUN control right, the LUN allocation for each FE port, and the shared memory information arranged in the storage controller before the saving to the added new storage controller 112 (step 1308). Then, the process proceeds to step 1309.

In step 1309, by referring to the controller version information 702, the storage controller 102 determines whether or not the old storage controller 102 remains in the storage system. When the old storage controller 102 remains, the process returns to step 1301. When the entire replacement with the new storage controller 112 is ended, the process proceeds to step 1310.

In step 1310, the storage controller 112 updates the control logic version management information 406 and switches to a control logic that can be operated only by the new storage controller 112.

Steps 1311 to 1316 are processing procedures for performing an upgrade in a procedure in which storage controller nodes are added and, after that, reduced.

In step 1311, in order to urge the worker to install the apparatus and wire the cables and the like, the storage controller 102 displays an addition work instruction for the new storage node 111 on the management screen and, after that, waits for the operation from the worker (Step 1312). An example of the screen displayed in step 1311 will be described later with reference to FIG. 24B. In addition, the details of the operation of the worker executed in step 1312 will be described later with reference to FIG. 21.

When receiving the operation from the worker, the storage controller 102 starts the addition process of adding the new storage node 111 (step 1313).

Next, the storage controller 102 migrates the LUN control right registered in the storage controller 102 that is a reduction target, the LUN allocation for each FE port, and the shared memory information arranged in the storage controller 102 that is a reduction target to the added new storage controller 112 (step 1314).

When the migration is ended, the storage controller 102 reduces the storage node that is a reduction target (step 1315). Next, the storage controller 102 displays a reduction work instruction of the reduced old storage node 101 on the management screen in order to urge the worker to detach the device and the cable (step 1316). Then, the process proceeds to step 1309. It is noted that, in response to the instruction in step 1316, the worker executes the reduction work. An example of the screen displayed in step 1316 will be described later with reference to FIG. 24C. In addition, the details of the reduction work executed after step 1316 will be described later with reference to FIG. 22.

Figure 14:
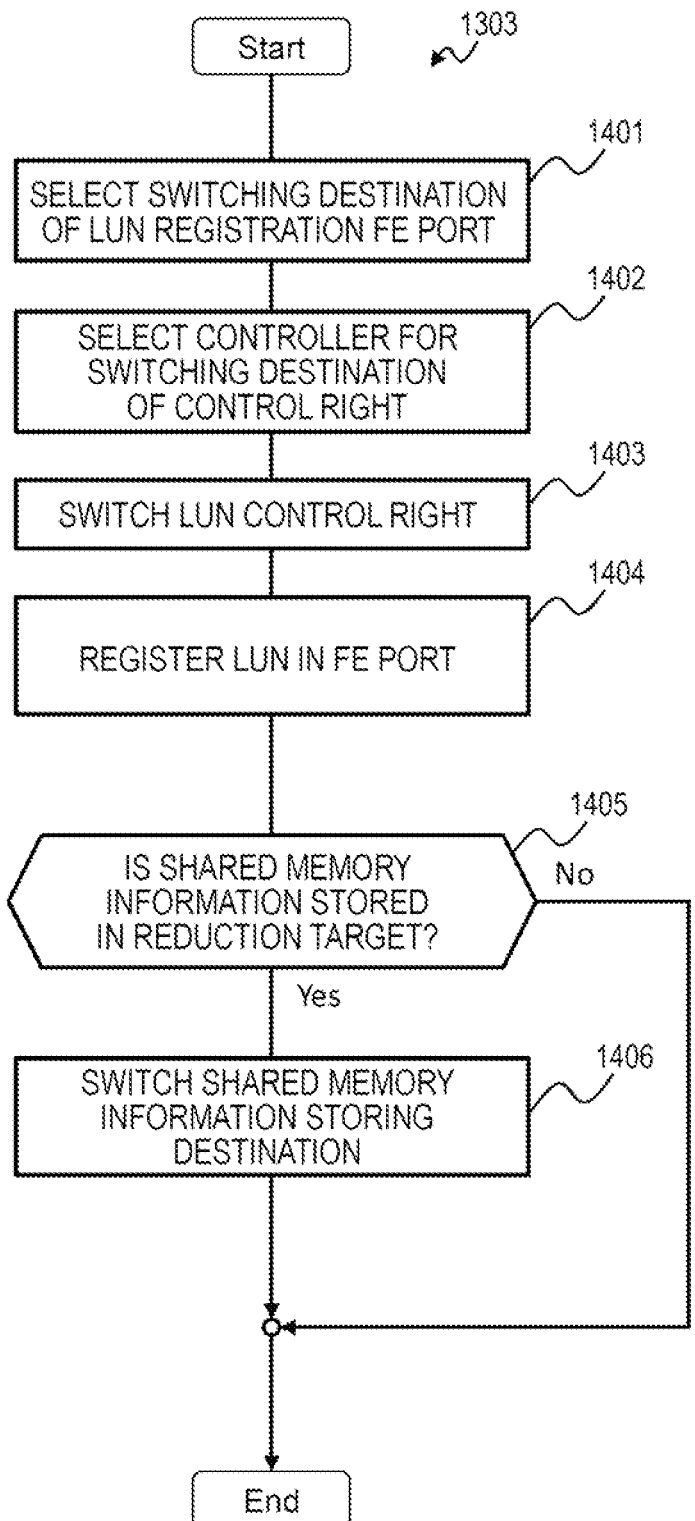
FIG. 14 is a flowchart illustrating a takeover process executed by the storage controller at the time of reduction of the old storage controller during the maximum configuration in the embodiment of the present invention.

FIG. 14 is a flowchart illustrating a takeover process (step 1302) executed by the storage controller 102 when the old storage controller 102 is reduced during the maximum configuration in the embodiment of the present invention.

First, the storage controller 102 selects a migration destination of the LUN registration information of each FE port 103 stored by the storage controller 102 that is a reduction target, and registers the migration destination in the takeover management information 605 (step 1401). At that time, by referring to the LUN configuration information 603, the storage controller 102 selects the FE port of the storage controller 102 other than the storage controller 102 including the FE port 103 in which the LUN is already registered, as a migration destination (that is, a new registration destination) of the LUN registered in the FE port 103 stored by the storage controller 102 that is a reduction target. This avoids loss of redundancy during the upgrade of the storage controller.

However, when there is no storage controller 102 other than the storage controller 102 including the FE port 103 in which the LUN is already registered, the storage controller 102 selects the FE port 103 in which the LUN is not yet registered in the storage controller 102 including the FE port 103 in which the LUN is already registered. When such an FE port 103 does not exist, the FE port 103 in which the LUN is already registered may be selected.

Next, the storage controller 102 selects a controller for a switching destination of the LUN control right and registers the controller in the takeover management information 605 (step 1402). At that time, by referring to the LUN configuration information 603, the storage controller 102 may select the storage controller 102 having a small number of LUNs having the control right as the switching destination of the LUN control right. Accordingly, the load distribution is implemented. Alternatively, the storage controller 102 may select the storage controller 102 including the FE port 103 in which the LUN is registered as the switching destination of the LUN control right. Accordingly, communication between the storage controllers is generated for each access from the host computer 120, and thus, the I/O performance is prevented from being deteriorated.

Next, by referring to the set takeover management information 605, the storage controller 102 switches the LUN control right (step 1403).

Next, by referring to the set takeover management information 605, the storage controller 102 performs LUN registration for the FE port 103 which is a target (step 1404).

The LUN control right switching (step 1403) and the LUN registration (step 1404) may be sequentially performed for each LUN.

Next, the storage controller 102 determines whether or not the information in the shared memory area 404 is stored in the storage controller 102 that is a reduction target (step 1405). When the information in the shared memory area 404 is stored, the process proceeds to step 1406. When the information is not included, the process ends without registering any one in the shared memory storage information 1104 of the takeover management information 605.

In step 1406, the information in the shared memory area 404 in the storage controller 102 that is a reduction target is migrated to the storage controller 102 (or 112) which is not a reduction target, and information of the migration destination storage controller 102 (or 112) and information in the migration destination shared memory area 404 are registered in the shared memory migration destination information 1107 and the shared memory storage information 1104 of the takeover management information 605. At that time, the storage controller 102 selects the storage controller 102 (or 112) that does not include the information in the shared memory to be migrated as the migration destination so that the redundancy of the shared memory to be migrated is not lost.

The takeover process executed by the storage controller 102 is ended when the old storage controller 102 is reduced during the maximum configuration.

Figure 15:
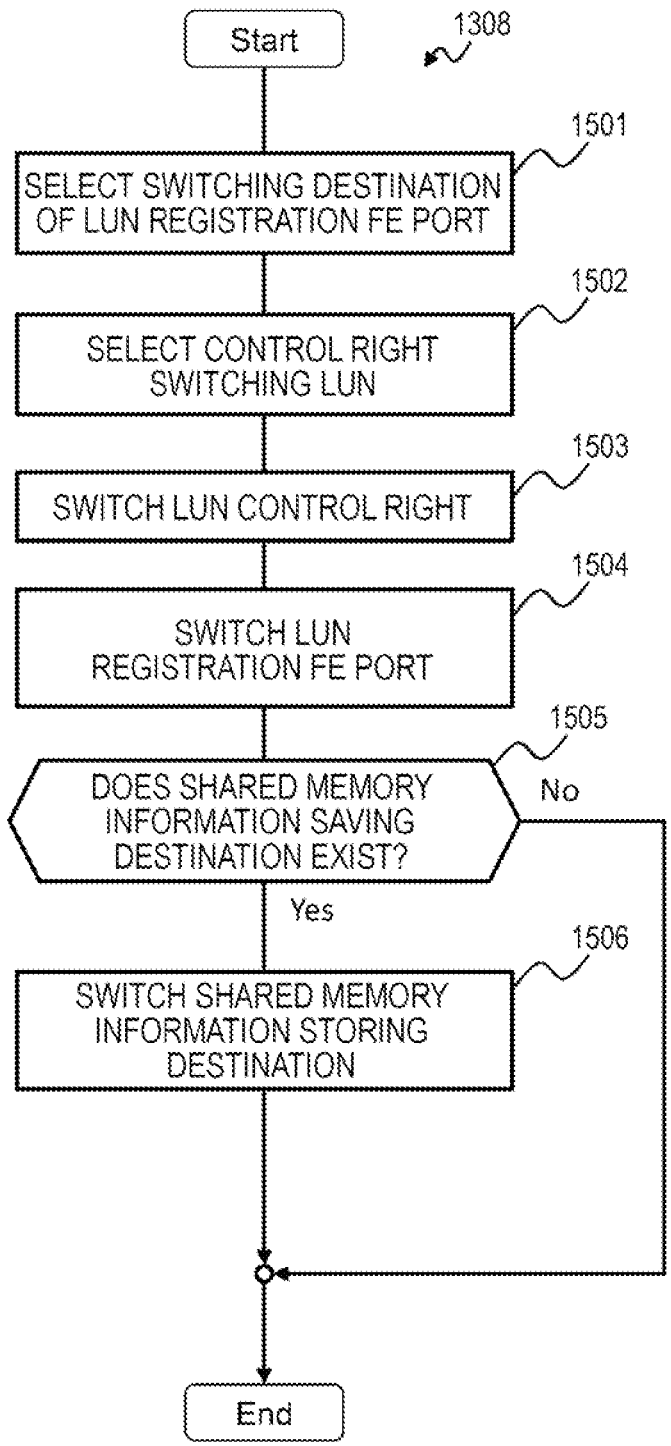
FIG. 15 is a flowchart illustrating a takeover process executed by the storage controller after the addition of the new storage controller during the maximum configuration in the embodiment of the present invention.

FIG. 15 is a flowchart illustrating a takeover process (step 1308) executed by the storage controller 102 after the addition of the new storage controllers 112 during the maximum configuration in the embodiment of the present invention.

First, by referring to the takeover management information 605, the storage controller 102 refers to the LUN registration information for each FE port 103 that is migrated to the added storage controller 112 (step 1501). Next, by referring to the takeover management information 605, the storage controller 102 selects the LUN of which control right is migrated to the added storage controller 112 (step 1502).

Next, the storage controller 102 switches the LUN control right to the added storage controller 112 (step 1503). Next, the storage controller 102 performs the LUN registration in the FE port 103 of the added storage controller 112 (step 1504). Next, by referring to the takeover management information 605, the storage controller 102 determines whether or not the information in the shared memory area 404 migrated from the storage controller 102 that is a reduction target to another storage controller 102 exists (step 1505). When the information in the shared memory area 404 exists, the process proceeds to step 1506. When the information does not exist, the process ends.

In step 1506, the information in the shared memory area 404 saved from the reduced storage controller 102 is migrated to the added storage controller 112.

This completes the takeover process executed by the storage controller 102 after the addition of the new storage controller 112 during the maximum configuration.

Figure 16:
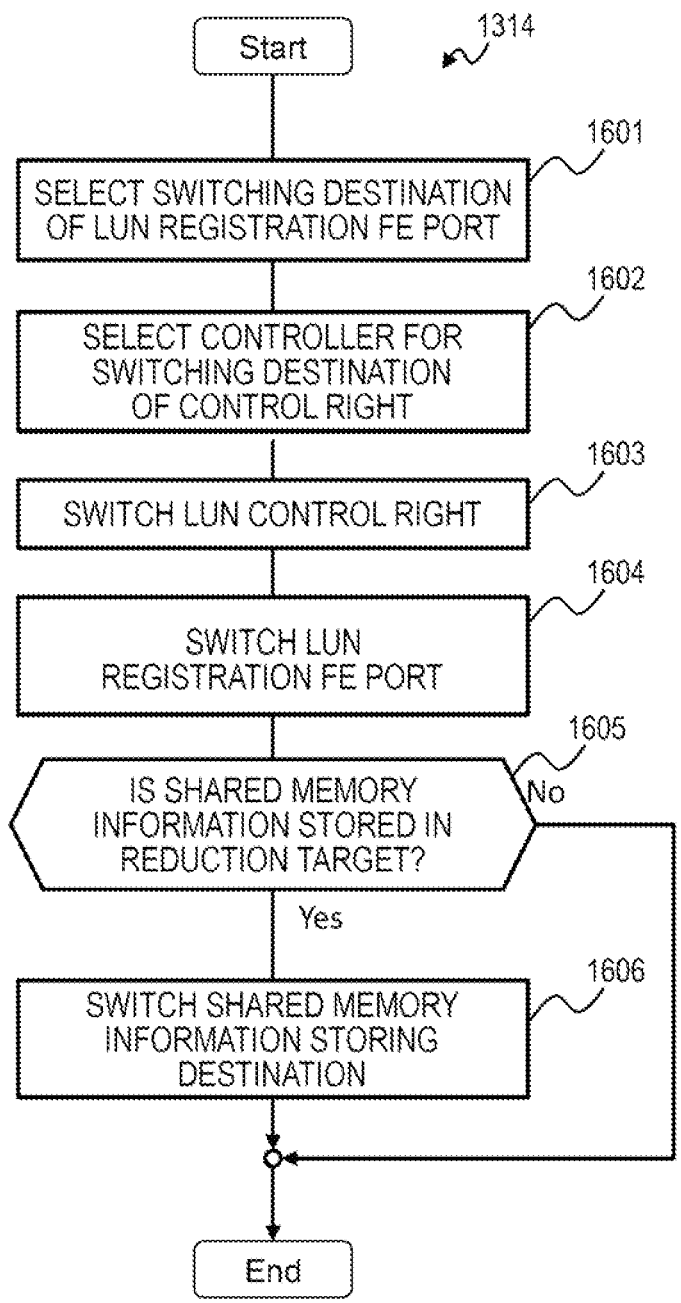
FIG. 16 is a flowchart illustrating a takeover process executed by the storage controller after the addition of the new storage controller 112 when the configuration is less than the maximum configuration in the embodiment of the present invention.

FIG. 16 is a flowchart illustrating a takeover process (step 1314) executed by the storage controller 102 after the addition of the new storage controller 112 when the configuration is less than the maximum configuration in the embodiment of the present invention.

First, by referring to the LUN registration information of the FE port 103 of the storage controller that is a reduction target, the storage controller 102 selects the registration takeover destination FE port 103 for each LUN (step 1601). Next, the storage controller 102 selects the storage controller 112 that is an addition target to which the control right for the LUN for which the storage controller 102 that is a reduction target retains the control right is transferred. When a plurality of the storage controllers to be added or reduced at one time exist, the storage controller 112 of the migration destination is selected so as to correspond to the storage controller 102 in which the LUN control right is registered (step 1602).

Next, the storage controller 102 switches the LUN control right to the added storage controller 112 (step 1603). Next, the storage controller 102 performs the LUN registration in the FE port 103 of the added storage controller 112 (step 1604). Step 1603 and step 1604 may be sequentially performed for each LUN.

Next, the storage controller 102 determines whether or not the information in the shared memory area 404 is included in the storage controller 102 that is a reduction target (step 1605). When the information in the shared memory area 404 exists, the process proceeds to step 1606. When the information does not exist, the process ends.

In step 1606, the storage controller 102 migrates the information in the shared memory area 404 from the storage controller 102 that is a reduction target to the added storage controller 112.

This completes the takeover process executed by the storage controller 102 after addition of the new storage controller 112 with a configuration less than the maximum configuration.

Figure 17:
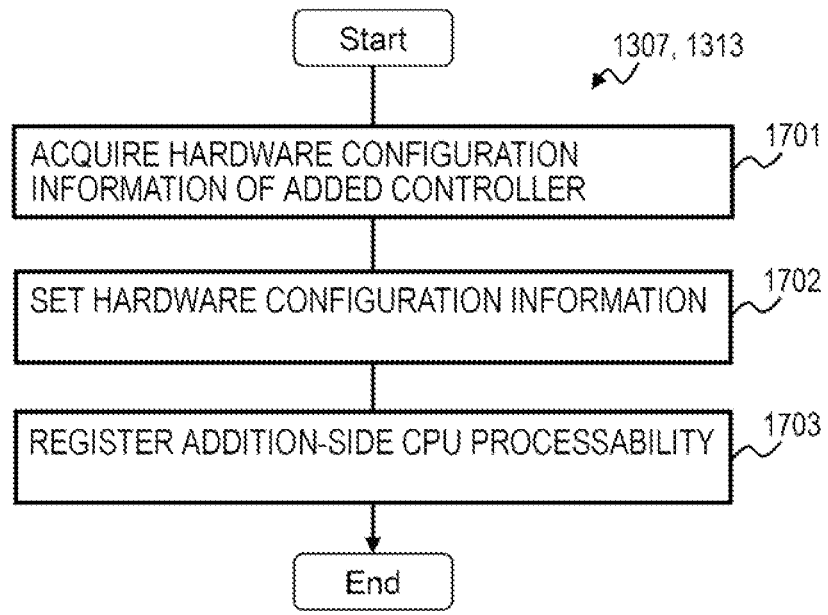
FIG. 17 is a flowchart illustrating a new controller addition process executed by the storage controller according to the embodiment of the present invention.

FIG. 17 is a flowchart illustrating a new controller addition process executed by the storage controllers 102 and 112 according to the embodiment of the present invention.

First, the new storage controller 112 that is an addition target acquires the hardware configuration information of the own storage controller 112 (step 1701). Specifically, the new storage controller 112 acquires the information corresponding to each item of the hardware configuration information 601 from hardware components such as the FE port 103, the CPU 104, the memory 105, the BE port 106, and the IC port 107 in the own storage controller 112.

Next, the new storage controller 112 sets the hardware configuration information (step 1702). Specifically, the storage controller 112 stores the information acquired in step 1701 in the memory 105 as the hardware configuration information 601.

Next, each of the storage controllers 102 and 112 operating in the storage system 100 at the time when this process is executed registers the addition-side CPU processability (step 1703). Accordingly, the identification information of the new storage controller 112 that is an addition target is added to the mounted controller ID list 801 of the mounted controller management information 602 stored by the storage controllers 102 and 112 in the storage system 100.

In this manner, the new controller addition process is ended.

Figure 18:
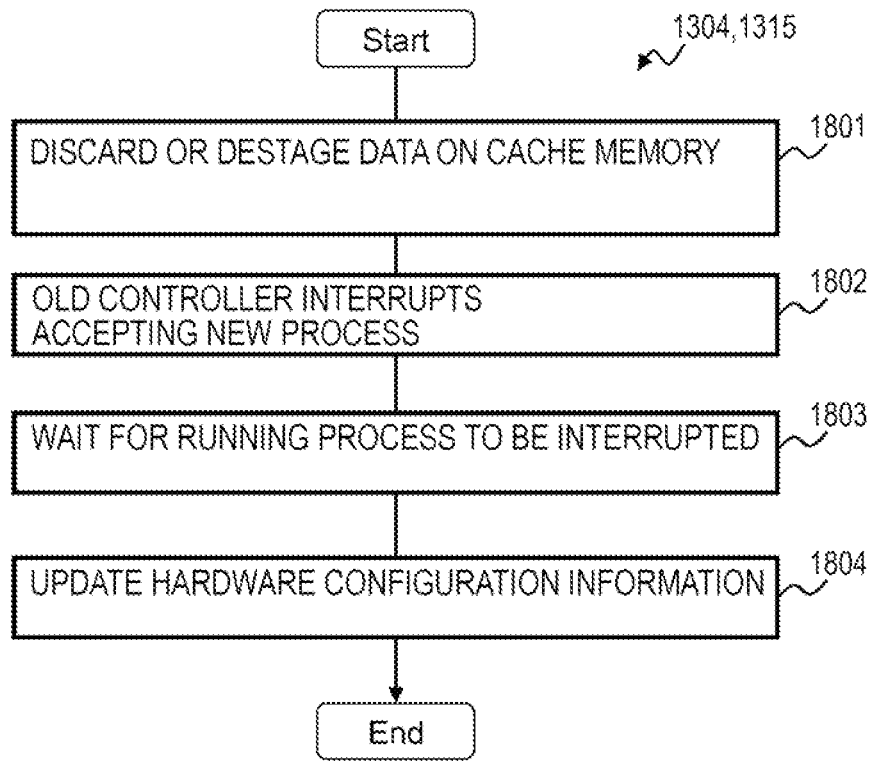
FIG. 18 is a flowchart illustrating an old controller reduction process executed by the storage controller in the embodiment of the present invention.

FIG. 18 is a flowchart illustrating an old controller reduction process executed by the storage controller 102 in the embodiment of the present invention.

First, the old storage controller 102 discards or destages the data on the cache memory area 403 (step 1801). Specifically, when the data on the cache memory area 403 is already stored in the storage area in the drive box 109, the old storage controller 102 deletes the data from the cache memory area 403. When the data is not yet stored in the storage area in the drive box 109, the old storage controller 102 stores the data in the storage area in the drive box 109 and, after that, deletes the data from the cache memory area 403.

Next, the old storage controller 102 interrupts accepting a new process (step 1802).

Next, the old storage controller 102 waits for the already accepted and running process to be interrupted (step 1803).

Next, at the time when this process is executed, each of the storage controllers 102 and 112 operating in the storage system 100 updates the hardware configuration information 601 so that the reduction of the old storage controller 102 is reflected (Step 1804). In addition, herein, the identification information of the reduced old storage controller 102 is deleted from the mounted controller ID list 801 of the mounted controller management information 602 stored by each storage controller 102 and 112.

In this manner, the old controller reduction process is ended.

FIG. 19 is a flowchart illustrating a CPU processing control right switching process executed by the storage controllers 102 and 112 according to the embodiment of the present invention.

First, the old storage controller 102 that is a reduction target interrupts accepting new I/O processing from the host computer 120 (step 1901).

Next, the old storage controller 102 waits for the already accepted and ongoing I/O processing to be completed (step 1902).

When the ongoing I/O processing is ended, the storage controllers 102 and 112 set the migration of the control right CPU (step 1903). Specifically, the value of the control right CPU ID 903 of the LUN configuration information 603 corresponding to the logical unit that is a control right transfer target is rewritten with the identification information of the CPU 104 of the storage controller 102 that is a control right transfer destination. For example, if the transfer source is the storage controller 102A and the transfer destination is the storage controller 102C, the value of the control right CPU ID 903 is rewritten from the identification information of the CPU 104 of the storage controller 102A to the identification information of the CPU 104 of the storage controller 102C.

In this manner, the CPU processing control right switching process is ended.

FIG. 20 is a flowchart illustrating an FE port switching process executed by the storage controllers 102 and 112 according to the embodiment of the present invention.

First, each storage controller 102 and 112 sets the LUN registration information in the FE port 103 (step 2001). Specifically, each of the storage controllers 102 and 112 updates the registered FE Port ID list 902 of the LUN configuration information 603 and the LUN ID list 1003 of the FE Port configuration information 604.

Next, a configuration change notification is transmitted from the FE port 103 of which LUN registration information has been changed to the host computer 120 (step 2002), and it is determined whether or not an inquiry has been received from the host computer 120 (step 2003).

When the inquiry is not received from the host computer 120, the connection to the host computer 120 cannot be confirmed, so that the storage controller 102 (or 112) interrupts the FE port switching process and transmits the fact that the process fails and the port ID of the failed FE port 103 to the management device 122 via the management network 123 (step 2004).

When the inquiry is received from the host computer 120, the FE port switching process is ended.

Figure 21:
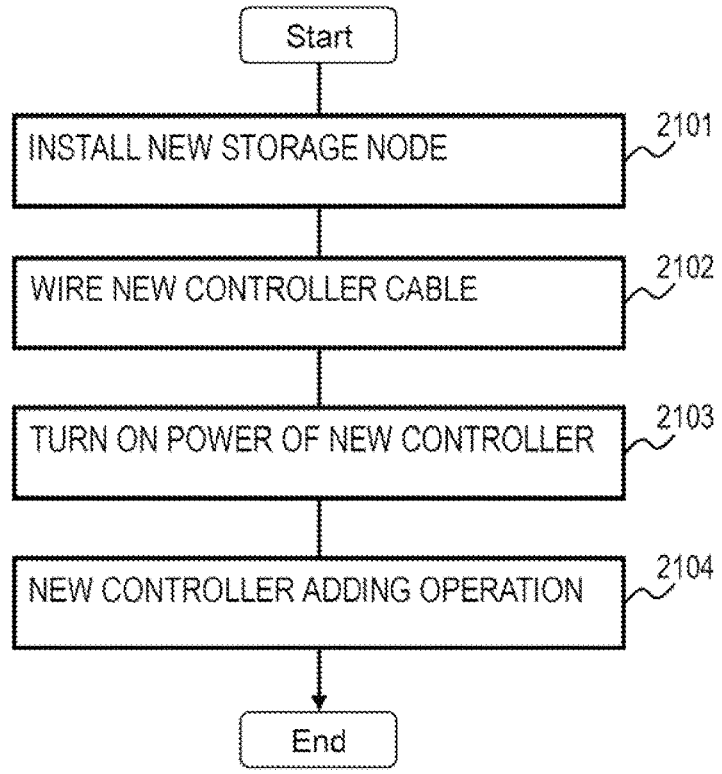
FIG. 21 is a flowchart illustrating a new controller addition work procedure executed by a storage controller upgrade execution worker in the embodiment of the present invention.

FIG. 21 is a flowchart illustrating a new controller addition work procedure executed by the storage controller upgrade execution worker in the embodiment of the present invention.

First, the worker installs the new storage node 111 in a rack (step 2101).

Next, the worker wires various cables to the FE port 103, BE port 106, and IC port 107 of the new storage controller 112 (step 2102). At that time, the various cables are connected to the same network as the network to which each of the cables of the old storage controller which is a replacement target by the new storage controller 112 is connected. Ina case where the cables cannot be connected to the same network due to no empty ports in the same network, various cables connected to the FE port 103, the BE port 106, and the IC port 107 of the old storage controller 102 which is a replacement target of the new storage controller 112 are unplugged in advance from the connection destination port, so that the cables can be allowed to be connected from the added storage controller.

Next, the worker turns on the power of the new storage controller 112 (step 2103). The power supply operation may be performed by the button attached to the storage controller main body or may be performed from the management device 122.

Finally, the worker performs an operation of adding the new storage node from the management device 122 (step 2104).

In this manner, the procedure for the worker to add new controllers is ended.

Figure 22:
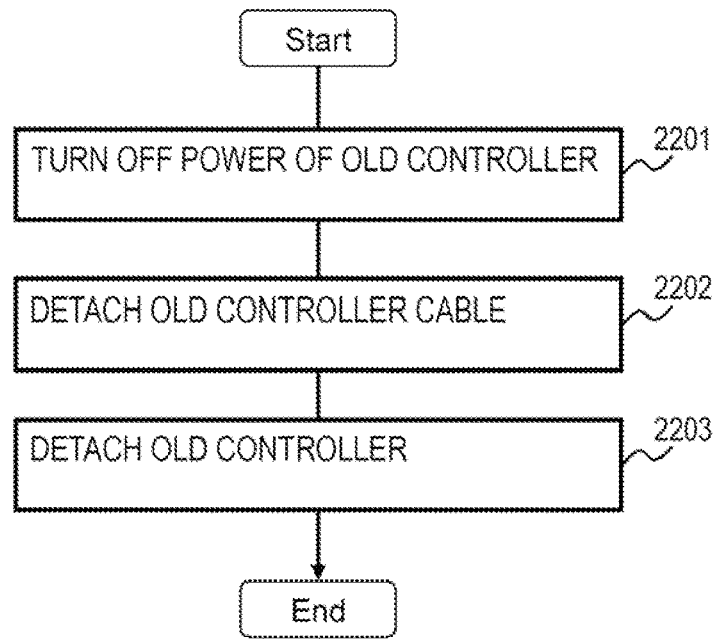
FIG. 22 is a flowchart illustrating an old controller reduction work processing procedure executed by the storage controller upgrade execution worker in the embodiment of the present invention.

FIG. 22 is a flowchart illustrating an old controller reduction work processing procedure executed by a storage controller upgrade execution worker in the embodiment of the present invention.

After confirming the screen of the storage node reduction instruction with the management device 122, the worker first turns off the power of the old controller (step 2201). Specifically, the worker may operate a power button attached to the storage controller 102 or may operate the management device 122. Next, the worker detaches the cable connected to the old storage controller 102 (step 2202).

Finally, the worker detaches the old storage node 101 from the rack (step 2203).

In this manner, the procedure for the worker to reduce the old controller is ended.

FIG. 23 is a flowchart illustrating a control logic including a control logic switching determination process executed by the storage controller in the embodiment of the present invention.

The process illustrated in FIG. 23 is executed by each of the old storage controller 102 and the new storage controller 112 constituting the storage system 100. For example, in a case where all the storage controllers in the storage system 100 are the old storage controllers 102 at the time when the upgrade of the storage controllers is started, each of the old storage controllers 102 executes the process illustrated in FIG. 23. When the old storage controllers 102 and the new storage controllers 112 exist in a mixed manner during the upgrade, each of the old storage controller 102 and the new storage controller 112 executes the process illustrated in FIG. 23. In a case where all the storage controllers in the storage system 100 are the new storage controller 112 when the upgrade of the storage controller is ended, each of the new storage controllers 112 executes the process illustrated in FIG. 23. Herein, as an example, the process executed by the new storage controller 112 will be described.

First, a certain new/old hardware version common logic A is executed in the storage controller 112 (step 2301). Next, before the execution of the process of changing the behavior depending on the hardware version, by referring to the control logic version information 1202 of the corresponding logic type from the control logic version management information 406, the storage controller 112 determines whether or not the control logic version corresponds to the new the storage controller (step 2302). When the control logic version corresponds, the process proceeds to step 2303. When the control logic version does not correspond, the process proceeds to step 2305.

In step 2303, the storage controller 112 performs the process by a new storage controller dedicated logic. After that, the process proceeds to the new/old common control logic B in step 2304.

In step 2305, the storage controller 112 performs the process according to the logic compatible with the old storage controller. After that, the process proceeds to the new/old common control logic B in step 2304.

In step 2304, the storage controller 112 executes the new/old common control logic B.

The process executed by the old storage controller 102 is the same as described above. However, in a case where at least one old storage controller 102 remains in the storage system 100, the control logic version does not correspond to the new storage controller. For this reason, the old storage controller 102 does not execute step 2303.

In this manner, it is possible to prevent some new storage controllers 112 from performing processing not compatible with the old storage controller 102 before the upgrade of all the storage controllers in the storage system 100 is ended.

As a process that changes the behavior depending on the hardware version, there are, for example, compression or encryption algorithm, that is, a process having a high CPU processing load or, in case of not a high-performance CPU with latest hardware, a process that is not intended to operate in order to suppress performance deterioration. In addition, even if there is no problem in hardware performance and software compatibility, there may be a case where it is desired to clearly define functions and performance that can be implemented as a product model. That is, the new storage controller dedicated logic may be a control logic that can be executed only by the new storage controller 112, but is not limited thereto. The new storage controller dedicated logic may be a control logic that is not executed by the old storage controller 102 although the control logic can be executed by any one of the new storage controller 112 and the old storage controller 102.

Figure 24A:
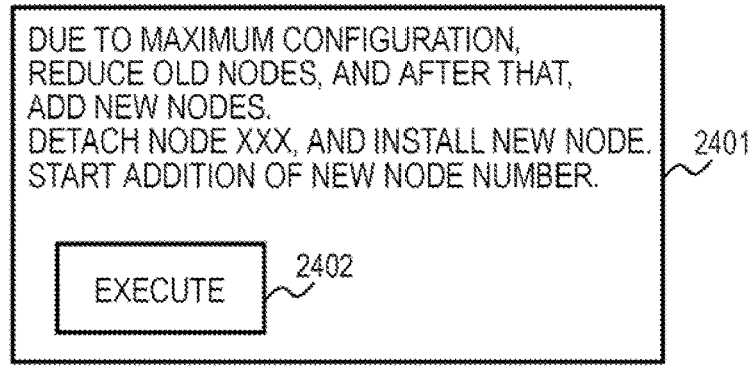
FIG. 24A is an explanatory diagram illustrating a storage controller upgrade work instruction screen displayed on a management device according to the embodiment of the present invention.
Figure 24B:
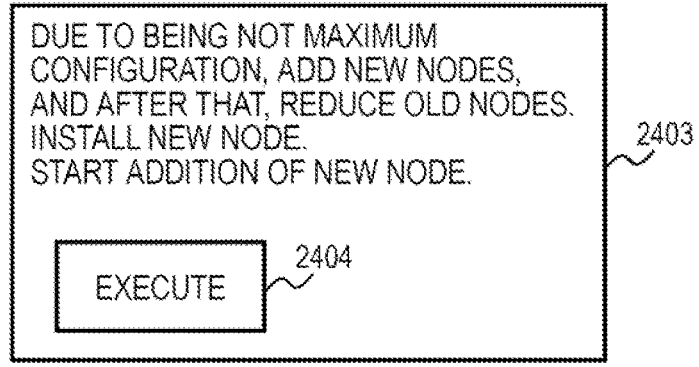
FIG. 24B is an explanatory diagram illustrating the storage controller upgrade work instruction screen displayed on the management device according to the embodiment of the present invention.
Figure 24C:
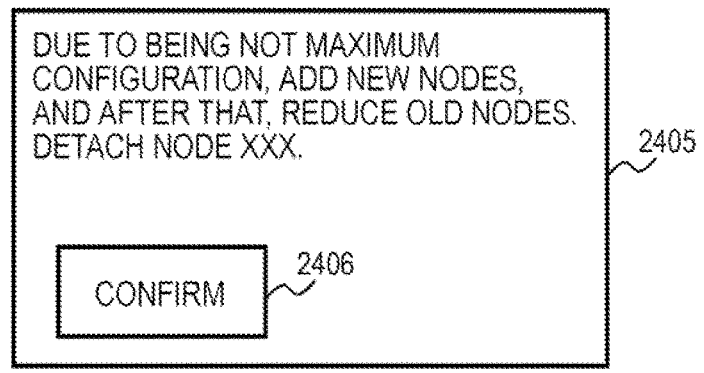
FIG. 24C is an explanatory diagram illustrating the storage controller upgrade work instruction screen displayed on the management device according to the embodiment of the present invention.

FIGS. 24A to 24C are explanatory diagrams illustrating a storage controller upgrade work instruction screen displayed on the management device according to the embodiment of the present invention.

FIG. 24A is an example of a screen displayed before addition of a new node when the number of storage controllers is the maximum number of storage systems before the upgrade.

The screen 2401 illustrated in FIG. 24A is displayed, for example, by a display device (not illustrated) of the management device 122 in step 1305 of FIG. 13. The screen 2401 includes information indicating a procedure for adding a new storage node after reducing the old storage node, information specifying a storage node that is a reduction target, information instructing reduction of the specified storage node and addition of a new storage node, an execution button 2402, and the like. When the worker reduces the old storage node that is a reduction target (refer to FIG. 23), adds a new storage node (refer to FIG. 22), and operates the execution button 2402 according to the screen, the processes after step 1307 are executed.

FIG. 24B is an example of a screen displayed before addition of a new node when the number of storage controllers is less than the maximum number of storage systems before the upgrade.

The screen 2403 illustrated in FIG. 24B is displayed, for example, by a display device (not illustrated) of the management device 122 in step 1311 of FIG. 13. The screen 2403 includes information indicating a procedure for reducing the old storage node after adding a new storage node, information instructing addition of a new storage node, an execution button 2404, and the like. When the worker adds a new storage node (refer to FIG. 22) and operates the execution button 2404 according to the screen, the processes after step 1313 are executed.

FIG. 24C is an example of a screen displayed before reduction of the old storage node when the number of storage controllers is less than the maximum number of storage systems before the upgrade.

The screen 2405 illustrated in FIG. 24C is displayed, for example, by a display device (not illustrated) of the management device 122 in step 1316 of FIG. 13. The screen 2405 includes information indicating a procedure for reducing the old storage node after adding a new storage node, information specifying the storage node that is a reduction target, information instructing reduction of the specified storage node, a confirmation button 2406, and the like. When the worker reduces the old storage node (refer to FIG. 23) and operates the confirmation button 2406 according to the screen, the management device 122 and the storage system 100 recognize that the old storage node that is a reduction target is detached.

In addition, the system of the embodiment of the present invention may be configured as follows.

(1) A storage system (for example, the storage system 100) including:

a storage drive (for example, the drive box 109) having a storage medium for storing a data; and a plurality of storage control units (for example, at least one of storage controllers 102 and 112) having a processor (for example, the CPU 104), a memory (for example, the memory 105), and a port (for example, the FE port 103, the BE port 106, and the IC port 107) to process the data input and output to and from the storage drive, wherein information related to a list (for example, a mounted controller ID list 801) of the storage control units mounted on the storage system and a maximum number (for example, a maximum number 802 of mountable controllers) of the storage control units that can be mounted on the storage system is allowed to be stored, and wherein, when the storage control unit is replaced, it is determined whether the configuration to be migrated from the storage control unit to be reduced to the storage control unit to be added is migrated directly or via another storage control unit based on the number of the mounted storage control units and the maximum number of the storage control units that can be mounted (for example, steps 1302 to 1308 and 1311 to 1316).

Accordingly, depending on the number of connected storage control units, it is possible to replace the hardware without interruption and by suppressing the influence of redundancy and performance deterioration.

(2) In the above-mentioned (1), when the number of the mounted storage control units is the maximum number that can be mounted, the configuration of the storage control units is migrated via another storage control unit, and (for example, steps 1303 to 1308), and when the number of the mounted storage control units is less than the maximum number that can be mounted, the configuration of the storage control units is directly migrated from the storage control unit to be reduced to the storage control unit to be added (for example, steps 1311 to 1316).

Accordingly, depending on the number of connected storage control units, it is possible to replace the hardware without interruption and by suppressing the influence of redundancy and performance deterioration.

(3) In the above-mentioned (2), a control right for inputting and outputting a data to and from a recording area of the storage drive is set in the storage control unit, and the storage control unit having the control right has control information for accessing a storage area relating to the control right and port setting information, and the migrated configuration is the control right, the control information, and the port setting information (for example, the LUN configuration information 603, the FE port configuration information 604, or the like).

Accordingly, depending on the number of connected storage control units, it is possible to replace the hardware without interruption and by suppressing the influence of redundancy and performance deterioration.

(4) In the above-mentioned (3), the data associated with the control right is stored in the memory of the storage control unit, and the migrated configuration includes the data in the memory associated with the control right.

Accordingly, depending on the number of connected storage control units, it is possible to replace the hardware without interruption and by suppressing the influence of redundancy and performance deterioration.

(5) In the above-mentioned (4), the storage control unit after replacement can execute a first control program and a second control program, and the storage control unit before replacement can at least execute the second control program, when all the storage control units in the storage system are the storage control units after the replacement, the first control program is used to process the data input and output to and from the storage drive (for example step 2303), and when at least one storage control unit in the storage system is the storage control unit before the replacement, the second control program is used to process the data input and output to and from the storage drive (for example, step 2305).

Accordingly, it is possible to update to software corresponding to the replaced hardware without interruption and by suppressing the influence of redundancy and performance deterioration. In addition, each process executed in the storage system can be executed on any one side of the storage control units before and after the replacement, and each process can be switched to be executed in the storage control unit after the replacement without interruption of the I/O.

(6) In the above-mentioned (5), the process of reducing the storage control unit before the replacement includes a process of storing a data of a cache area of the memory of the storage control unit that is a reduction target in the storage drive, a process of changing the port so that the storage control unit that is a reduction target interrupts accepting an access request, and a process of updating hardware configuration information in the memory so that the reduction of the storage control unit that is a reduction target is reflected (for example, steps 1304, 1315, and 1808 to 1804), and a process of adding the storage control unit includes a process of updating the hardware configuration information in the memory so that the addition of the storage control unit is reflected (for example, steps 1307, 1313, and 1701 to 1703).

This allows the storage control unit to be updated with new hardware.

(7) In the above-mentioned (6), each storage control unit provides a port and a logical unit for performing data input and output by the host computer, the logical unit is associated with the port, when the number of the storage control units mounted on the storage system is the maximum number, in the process of reducing the storage control unit that is a reduction target, a process of selecting the port of any storage control unit other than the old storage control unit that is a reduction target and associating the logical unit associated with the port of the storage control unit that is a reduction target with the selected port is executed (for example, steps 1303 and 1401 to 1406), in the process of adding the storage control unit, a process of associating the logical unit associated with the selected port with the port of the added storage control unit is executed (for example, steps 1308 and 1501 to 1506), and when the number of the storage control units mounted on the storage system is less than the maximum number, in the process of adding the storage control units and reducing the old storage control units that is a reduction target, a process of associating the logical unit associated with the port of the storage control unit that is a reduction target with the port of the storage control unit to be added is executed (for example, steps 1314 and 1601 to 1606).

Accordingly, the configuration information of the logical unit or the like that has been set before the replacement is taken over by the storage control unit after the replacement, and the drive connected to the storage control unit before the replacement is taken over by the storage control unit after the replacement as it is.

(8) In the above-mentioned (7), the selected port is the port included in another storage control unit different from the storage control unit having the port already associated with the logical unit associated with the port of the storage control unit that is a reduction target.

Accordingly, the redundancy is prevented from being deteriorated during the execution of the update of the storage control unit.

(9) In the above-mentioned (2), when the number of the mounted storage control units is less than the maximum number that can be mounted, adding the storage control units so that the number of the storage control units is equal to or less than the maximum number, migrating a configuration of the storage control units from the storage control units to be reduced to the storage control units to be added and reducing the storage control unit are repeated a plurality of times to replace a plurality of the storage control units.

Accordingly, depending on the number of connected storage control units, it is possible to replace the hardware without interruption and by suppressing the influence of redundancy and performance deterioration.

It is noted that the present invention is not limited to the above-described examples but includes various modifications. For example, the above-described embodiment has been described in detail for the better understanding of the present invention, but the present invention is not necessarily limited to the one including all the configurations of the description. In addition, it is possible to replace a portion of the configuration of one embodiment with the configuration of another embodiment, and it is possible to add the configuration of another embodiment to the configuration of one embodiment. In addition, it is possible to add/delete/replace a portion of the configuration of each embodiment with another configuration.

In addition, each of the configurations, the functions, the processing units, the processing means, and the like described above may be implemented by hardware by designing a portion or all thereof by, for example, an integrated circuit. In addition, each of the configurations, the functions, and the like described above may be implemented by software by allowing the processor to interpret and execute a program that implements each function. Information of programs, tables, and files that implement the respective functions can be stored in storage devices such as non-volatile semiconductor memories, hard disk drives, and solid-state drives (SSDs), or computer-readable non-temporary data storage media such as IC cards, SD cards, and DVDs.

In addition, the control lines and the information lines are illustrated as necessary for explanation, and all control lines and the information lines are not necessarily illustrated in the product. In practice, it can be considered that almost all configurations are connected to each other.

What is claimed is:
1. A storage system comprising:
a storage drive having a storage medium storing a data; and a plurality of controller nodes, each provided with a plurality of controllers each controller having a processor, a memory, and a port to process the data input and output to and from the storage drive, the storage drive and the controller nodes being connected to each other, wherein, when the controllers of a first controller node are replaced in response to an addition of a second controller node and a reduction of the first controller node, with the second controller node and the first controller node being connected to the storage drive, the first controller node makes control information used by the plurality of controllers included in the first controller node available to the plurality of controllers included in the second controller node, wherein, while the plurality of controllers included in the first controller node and the plurality of controllers included in the second controller node are allowed to input and output the data to and from the storage drive, the second controller node switches a controller to be used for the data input and output to and from the storage drive from the plurality of controllers of the first controller node to the plurality of controllers of the second controller node, and reduces the first controller node, wherein information related to a list of the controllers mounted on the storage system and a maximum number of the controllers that can be mounted on the storage system is stored, and wherein it is determined whether a configuration to be migrated from the controllers of the first controller node to the controllers of the second controller node is migrated directly or via another controller based on a number of the mounted controllers and the maximum number of the controllers that can be mounted.

2. The storage system according to claim 1,
wherein the plurality of controllers of the controller nodes are each connected to the storage drive and are communicable with each other via an interconnect switch, and
the controllers of the second controller node and the controllers of the first controller node share the control information via the interconnect switch.

3. The storage system according to claim 1,
wherein, when the number of the mounted controllers is the maximum number that can be mounted, the configuration of the controllers is migrated via another controller, and
wherein, when the number of the mounted storage control units is less than the maximum number that can be mounted, the configuration of the controllers is directly migrated from the controllers of the first controller node to be reduced to the controllers of the second controller node.

4. The storage system according to claim 1,
wherein a control right for inputting and outputting data to and from a recording area of the storage drive is set in each of the controllers, and the controller having the control right has control information for accessing a storage area relating to the control right and port setting information, and
wherein the migrated configuration is the control right, the control information, and the port setting information.

5. The storage system according to claim 4,
wherein data associated with the control right is stored in the memory of each of the controllers, and wherein the migrated configuration includes the data in the memory associated with the control right.

6. The storage system according to claim 1,
wherein the controllers are replaced to change a control program to be executed by the controllers from a second control program to a first control program,
wherein the controllers after replacement can execute the first control program and the second control program,
wherein the controllers before replacement can execute at least the second control program,
wherein, when at least one controller in the storage system is one of the controllers before the replacement, the second control program is used to process data input and output to and from the storage drive by all the controllers including the one controller before the replacement and at least one of the controllers after the replacement, and
wherein, when all the controllers in the storage system become the controllers after the replacement, the control program is changed and all the controllers process data input and output to and from the storage drive using the first control program.

7. The storage system according to claim 6,
wherein the at least one of the controllers before the replacement is incapable of executing the first control program, and
all the controllers in the storage system change the control program simultaneously from the second control program to the first control program.

8. The storage system according to claim 6,
wherein the process of reducing the first controller node includes a process of storing a data of a cache area of the memory of the controllers of the first controller node in the storage drive, a process of changing the ports so that the controllers of the first controller node interrupt accepting an access request, and a process of updating hardware configuration information in the memory so that the reduction of the first controller node is reflected, and
wherein a process of adding the second controller node includes a process of updating the hardware configuration information in the memory so that the addition of the second controller node is reflected.

9. A storage system comprising:
a storage drive having a storage medium storing a data; and
a plurality of controller nodes, each provided with a plurality of controllers each controller having a processor, a memory, and a port to process the data input and output to and from the storage drive, the storage drive and the controller nodes being connected to each other,
wherein, when the controllers of a first controller node are replaced in response to an addition of a second controller node and a reduction of the first controller node, with the second controller node and the first controller node being connected to the storage drive,
the first controller node makes control information used by the plurality of controllers included in the first controller node available to the plurality of controllers included in the second controller node,
wherein, while the plurality of controllers included in the first controller node and the plurality of controllers included in the second controller node are allowed to input and output the data to and from the storage drive, the second controller node switches a controller to be used for the data input and output to and from the storage drive from the plurality of controllers of the first controller node to the plurality of controllers of the second controller node, and reduces the first controller node, wherein information related to a list of the controllers mounted on the storage system and a maximum number of the controllers that can be mounted on the storage system is stored, wherein it is determined whether a configuration to be migrated from the controllers of the first controller node to the controllers of the second controller node is migrated directly or via another controller based on a number of the mounted controllers and the maximum number of the controllers that can be mounted, wherein the controllers are replaced to change a control program to be executed by the controllers from a second control program to a first control program, wherein the controllers after replacement can execute the first control program and the second control program, wherein the controllers before replacement can execute at least the second control program, wherein, when at least one controller in the storage system is one of the controllers before the replacement, the second control program is used to process data input and output to and from the storage drive by all the controllers including the one controller before the replacement and at least one of the controllers after the replacement, wherein, when all the controllers in the storage system become the controllers after the replacement, the control program is changed and all the controllers process data input and output to and from the storage drive using the first control program, wherein the process of reducing the first controller node includes a process of storing a data of a cache area of the memory of the controllers of the first controller node in the storage drive, a process of changing the ports so that the controllers of the first controller node interrupt accepting an access request, and a process of updating hardware configuration information in the memory so that the reduction of the first controller node is reflected, wherein a process of adding the second controller node includes a process of updating the hardware configuration information in the memory so that the addition of the second controller node is reflected, wherein each controller provides a port and a logical unit for performing data input and output by the host computer, wherein the logical unit is associated with the port, wherein, when the number of the controllers mounted on the storage system is a maximum number, in the process of reducing the first controller node, a process of selecting the port of the controller other than the controller of the first controller node and associating the logical unit associated with the port of the controller of the second controller node with the selected port is executed, and in the process of adding the second controller node, a process of associating the logical unit associated with the selected port with the port of the controller of the second controller node is executed, and wherein, when the number of the controllers mounted on the storage system is less than the maximum number, in the process of adding the second controller node and reducing the first controller node, a process of associating the logical unit associated with the port of the controller of the first controller node with the port of the controller of the second controller node is executed.

10. The storage system according to claim 9, wherein the selected port is the port included in another controller different from the controller having the port already associated with the logical unit associated with the port of the controller of the first controller node.

11. The storage system according to claim 3, wherein, when the number of the mounted controllers is less than the maximum number that can be mounted, adding the second controller node so that the number of the controllers is equal to or less than the maximum number, migrating a configuration of the controllers from the controllers of the first controller node to the controllers of the second controller node and reducing the first controller node are repeated a plurality of times to replace a plurality of the controllers.

12. A control method for a storage system including: a storage drive having a storage medium storing a data; and a plurality of controller nodes, each provided with a plurality of controllers each controller having a processor, a memory, and a port to process the data input and output to and from the storage drive, the storage drive and the controller nodes being connected to each other, wherein, when the controllers of a first controller node are replaced in response to an addition of a second controller node and a reduction of the first controller node, with the second controller node and the first controller node being connected to the storage drive, the control method comprising the steps of:

making, by the first controller node, control information used by the plurality of controllers included in the first controller node available to the plurality of controllers included in the second controller node;

while the plurality of controllers included in the first controller node and the plurality of controllers included in the second controller node are allowed to input and output the data to and from the storage drive, switching, by the second controller node, a controller to be used for the data input and output to and from the storage drive from the plurality of controllers of the first controller node to the plurality of controllers of the second controller node, and reducing the first controller node;

storing information related to a list of the controllers mounted on the storage system and a maximum number of the controllers that can be mounted on the storage system; and determining whether a configuration to be migrated from the controllers of the first controller node to the controllers of the second controller node is migrated directly or via another controller based on a number of the mounted controllers and the maximum number of the controllers that can be mounted.

13. A control method for a storage system including: a storage drive having a storage medium storing a data; and a plurality of controller nodes, each provided with a plurality of controllers each controller having a processor, a memory, and a port to process the data input and output to and from the storage drive, the storage drive and the controller nodes being connected to each other, wherein, when the controllers of a first controller node are replaced in response to an addition of a second controller node and a reduction of the first controller node, with the second controller node and the first controller node being connected to the storage drive, the control method comprising the steps of:

making, by the first controller node, control information used by the plurality of controllers included in the first controller node available to the plurality of controllers included in the second controller node;

while the plurality of controllers included in the first controller node and the plurality of controllers included in the second controller node are allowed to input and output the data to and from the storage drive, switching, by the second controller node, a controller to be used for the data input and output to and from the storage drive from the plurality of controllers of the first controller node to the plurality of controllers of the second controller node, and reducing the first controller node;

storing information related to a list of the controllers mounted on the storage system and a maximum number of the controllers that can be mounted on the storage system;

determining whether a configuration to be migrated from the controllers of the first controller node to the controllers of the second controller node is migrated directly or via another controller based on a number of the mounted controllers and the maximum number of the controllers that can be mounted, wherein the controllers are replaced to change a control program to be executed by the controllers from a second control program to a first control program, wherein the controllers after replacement can execute the first control program and the second control program, wherein the controllers before replacement can execute at least the second control program, wherein, when at least one controller in the storage system is one of the controllers before the replacement, the second control program is used to process data input and output to and from the storage drive by all the controllers including the one controller before the replacement and at least one of the controllers after the replacement, wherein, when all the controllers in the storage system become the controllers after the replacement, the control program is changed and all the controllers process data input and output to and from the storage drive using the first control program, wherein the process of reducing the first controller node includes a process of storing a data of a cache area of the memory of the controllers of the first controller node in the storage drive, a process of changing the ports so that the controllers of the first controller node interrupt accepting an access request, and a process of updating hardware configuration information in the memory so that the reduction of the first controller node is reflected, wherein a process of adding the second controller node includes a process of updating the hardware configuration information in the memory so that the addition of the second controller node is reflected, wherein each controller provides a port and a logical unit for performing data input and output by the host computer, wherein the logical unit is associated with the port, wherein, when the number of the controllers mounted on the storage system is a maximum number, in the process of reducing the first controller node, a process of selecting the port of the controller other than the controller of the first controller node and associating the logical unit associated with the port of the controller of the second controller node with the selected port is executed, and in the process of adding the second controller node, a process of associating the logical unit associated with the selected port with the port of the controller of the second controller node is executed, and wherein, when the number of the controllers mounted on the storage system is less than the maximum number, in the process of adding the second controller node and reducing the first controller node, a process of associating the logical unit associated with the port of the controller of the first controller node with the port of the controller of the second controller node is executed.

* * * * *